(12) United States Patent
Noble et al.

(10) Patent No.: US 12,455,724 B2
(45) Date of Patent: Oct. 28, 2025

(54) THEME-BUILDER FOR ACCESSIBILITY-AWARE DESIGN SERVICES

(71) Applicant: Capital One Financial Corporation, McLean, VA (US)

(72) Inventors: Lise W. Noble, Chapel Hill, NC (US); Daniel A. Gisolfi, Hopewell Junction, NY (US); Douglas Brian Scamahorn, Noblesville, IN (US); Andrew Bryan Smith, Apex, NC (US)

(73) Assignee: Capital One Financial Corporation, McLean, VA (US)

( * ) Notice: Subject to any disclaimer, the term of this patent is extended or adjusted under 35 U.S.C. 154(b) by 124 days.

(21) Appl. No.: 18/478,443

(22) Filed: Sep. 29, 2023

(65) Prior Publication Data
US 2025/0110701 A1      Apr. 3, 2025

(51) Int. Cl.
*G06F 8/20*       (2018.01)
*G06F 8/38*       (2018.01)

(52) U.S. Cl.
CPC . *G06F 8/20* (2013.01); *G06F 8/38* (2013.01)

(58) Field of Classification Search
CPC .................................... G06F 8/20; G06F 8/38
See application file for complete search history.

(56) References Cited

U.S. PATENT DOCUMENTS

| | | | |
|---|---|---|---|
| 9,886,168 B2 | 2/2018 | Sahasrabudhe et al. | |
| 2010/0131797 A1 | 5/2010 | Ganesh et al. | |
| 2020/0364064 A1* | 11/2020 | Nguyen | G06F 16/958 |
| 2021/0142531 A1* | 5/2021 | Echevarria Vallespi | G06T 11/001 |

(Continued)

FOREIGN PATENT DOCUMENTS

| | | | | |
|---|---|---|---|---|
| EP | 3852032 A1 * | 7/2021 | ............. | G06F 40/14 |
| WO | WO-2023101705 A1 * | 6/2023 | ......... | G06F 3/04817 |

OTHER PUBLICATIONS

International Searching Authority. International Search Report and Written Opinion issued in International Application No. PCT/US2024/048469, mailed on Dec. 30, 2024, 8 pages.

*Primary Examiner* — Phillip H Nguyen
(74) *Attorney, Agent, or Firm* — Lee Sullivan Shea & Smith LLP

(57) ABSTRACT

A computing system is configured to (i) receive input data for a visual interface design, the input data including a target accessibility compliance standard and initial design data for at least two visual interface design elements, (ii) based on the input data, determine a respective set of operations to apply to generate accessibility-compliant design data for each of the visual interface design elements, (iii) apply each respective set of operations to the respective initial design data and thereby generate the accessibility-compliant design data for each of the visual interface design elements, (iv) combine the accessibility-compliant design data for each of the visual interface design elements to thereby generate composite accessibility-compliant design data for a composite visual interface design element, and (v) based on the accessibility-compliant design data for the composite visual interface design element, cause a visual representation of accessibility-compliant content for the composite visual interface design element to be displayed.

20 Claims, 14 Drawing Sheets
(4 of 14 Drawing Sheet(s) Filed in Color)

(56) References Cited

U.S. PATENT DOCUMENTS

2022/0129123 A1    4/2022    Nair et al.
2022/0365989 A1   11/2022   Ekron
2023/0141070 A1    5/2023    Kristoffersen et al.
2023/0290483 A1*  9/2023    Randa .................... G16H 40/67

* cited by examiner

THEME-BUILDER FOR ACCESSIBILITY-AWARE DESIGN SERVICES

BACKGROUND

A wide range of impairments, such as vision impairments, hearing impairments, learning impairments, motion impairments, cognition impairments, etc., prevent billions of people globally from accessing and interacting with physical and digital content that is socially and economically necessary. The demand for inclusive content that provides accessibility to people with such impairments is rising, as is the need of content creators for tools to consistently generate inclusive, accessible content.

Overview

Disclosed herein is new technology that involves the use of accessibility-aware, atomic design services for visual interface design that include pre-encoded logic for satisfying one or more accessibility compliance standards.

In one aspect, the disclosed technology may take the form of a method to be carried out by a computing system that involves (i) receiving input data for a visual interface design, the input data comprising a target accessibility compliance standard and initial design data for at least two visual interface design elements, (ii) based on the input data, determining a respective set of operations to apply to the respective initial design data to generate accessibility-compliant design data for each of the at least two visual interface design elements, the accessibility-compliant design data usable to produce, for each of the at least two visual interface design elements, respective accessibility-compliant content, (iii) applying each respective set of operations to the respective initial design data and thereby generating the accessibility-compliant design data for each of the at least two visual interface design elements, (iv) combining the accessibility-compliant design data for each of the at least two visual interface design elements to thereby generate composite accessibility-compliant design data for a composite visual interface design element, the composite accessibility-compliant design data usable to produce, for the composite visual interface design element, accessibility-compliant content, and (v) based on the accessibility-compliant design data for the composite visual interface design element, causing a visual representation of accessibility-compliant content for the composite visual interface design element to be displayed.

In some example embodiments, the initial design data for at least two visual interface design elements may comprise first initial design data for a first visual interface design element and second initial design data for a second visual interface design element. In such embodiments, determining a respective set of operations to apply to the respective initial design data to generate accessibility-compliant design data for each of the at least two visual interface design elements and applying the set of operations to the respective initial design data and thereby generating the accessibility-compliant design data for each of the at least two visual interface design elements may involve (a) based on the input data, determining a first set of operations to apply to the first initial interface design data, (b) applying the first set of operations to the first initial interface design data and thereby generating first accessibility-compliant design data, (c) based on the input data and the first accessibility-compliant design data, determining a second set of operations to apply to the second initial interface design data, and (d) applying the second set of operations to the second initial interface design data and thereby generating second accessibility-compliant design data.

Further, in example embodiments, the accessibility-compliant design data for each of the at least two visual interface design elements may comprise a cascading style sheet (CSS) file or a javascript object notation (JSON) file.

In such embodiments, the method may further involve transmitting, to a computing device, the accessibility-compliant design data for each of the at least two visual interface design elements, the accessibility-compliant design data usable, by the computing device, to produce, for each of the at least two visual interface design elements, respective accessibility-compliant content.

Further yet, in example embodiments, the method may further involve, based on the accessibility-compliant design data for each of the at least two visual interface design elements, causing a visual representation of accessibility-compliant content for each of the at least two visual interface design elements to be displayed via a computing device.

Still further, in some example embodiments, the at least two visual interface design elements may comprise a first visual interface design element and second visual interface design element, the first interface design element comprising a color palette for the visual interface design and the second interface design element comprising a typography for the visual interface design.

Still further, in some example embodiments, the method may further involve (vi) after generating the accessibility-compliant design data for the composite visual interface design element, receive updated input data, the updated input data comprising an updated accessibility compliance standard and (ii) based on the updated input data, automatically (a) updating the respective sets of operations to apply to the respective initial design data to generate updated accessibility-compliant design data for each of the at least two visual interface design elements, the updated accessibility-compliant design data usable to produce, for each of the at least two visual interface design elements, respective updated accessibility-compliant content, (b) applying each updated set of operations to the respective initial design data and thereby generate the updated accessibility-compliant design data for each of the at least two visual interface design elements, (c) combining the updated accessibility-compliant design data for each of the at least two visual interface design elements to thereby generate updated accessibility-compliant design data for a composite visual interface design element, and (d) based on the updated accessibility-compliant design data for the composite visual interface design element, causing a visual representation of updated accessibility-compliant content for the composite visual interface design element to be displayed.

Still further, in some example embodiments, the input data further comprises an indication of at least one user impairment, wherein the accessibility-compliant design data is usable to produce, for each of the at least two visual interface design elements, accessibility-compliant content for the at least one user impairment, and wherein the composite accessibility-compliant design data usable to produce, for the composite visual interface design element, accessibility-compliant content for the at least one user impairment In such embodiments, the at least one user impairment may comprise one or more of a vision impairment, a hearing impairment, a learning impairment, a motion impairment, or a cognition impairment.

In yet another aspect, disclosed herein is a computing system that includes a network interface for communicating over at least one data network, at least one processor, at least one non-transitory computer-readable medium, and program instructions stored on the at least one non-transitory computer-readable medium that are executable by the at least one processor to cause the computing system to carry out the functions disclosed herein, including but not limited to the functions of the foregoing method.

In still another aspect, disclosed herein is at least one non-transitory computer-readable medium provisioned with program instructions that, when executed by at least one processor, cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
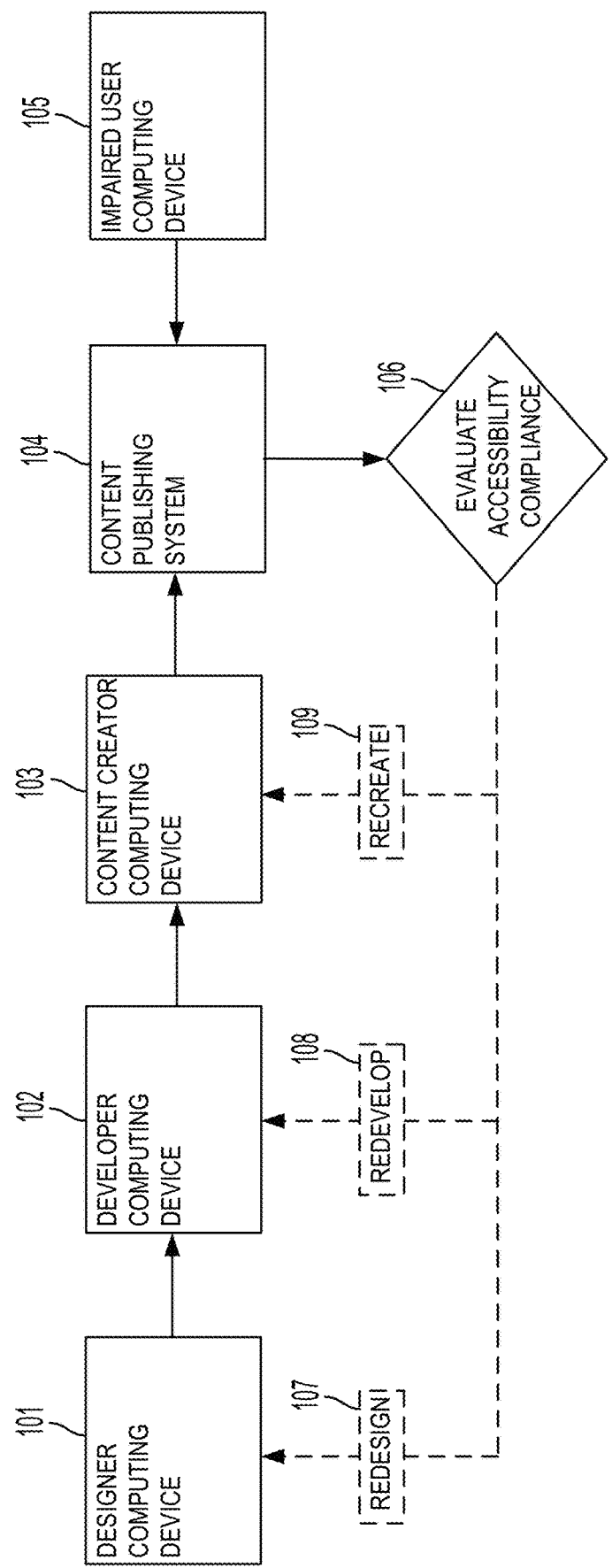
FIG. 1 is a simplified block diagram showing logical entities involved in creating accessibility-compliant content.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

Web accessibility, also sometimes referred to as e-accessibility, pertains to the design of websites, mobile applications, and other digital media content in a way that does not present barriers of access to people with disabilities or disorders. The types of disabilities and disorders, collectively referred to herein as impairments, that may be considered in this regard may take various forms. As some non-exhaustive examples, a person might have a visual impairment that affects his or her ability to see (e.g., color-blindness), an auditory or hearing impairment that affects his or her ability to hear, a learning impairment that affects his or her ability to learn in certain contexts (e.g., dyslexia), a motor impairment that affects his or her ability to perform coarse and/or fine motor functions (e.g., manipulating a mouse and/or keyboard), a motion impairment that affects his or her sensitivity to visual motion and/or repetitive patterns, amount numerous other examples.

The types of impairments noted above and the resulting lack of access that impaired people may have to certain inaccessible web-based content may negatively impact the quality of life for large groups of people in today's digital age. By some estimates, over a quarter of the world's population (i.e., at least 2.2 billion people) suffer from some form of visual impairment, and over half (i.e., approximately 5 billion people) use the internet and social media in some form. There are negative economic effects associated with such impairments as well. For example, vision impairments alone present a substantial global financial burden, with the global cost of productivity losses associated with vision impairment estimated to be US $411 billion annually.

To assist designers and content creators with the design and creation of web-based content that is accessible to people with impairments like those noted above, various standards have been developed. One prominent example is the Web Content Accessibility Guidelines (WCAG) (e.g., WCAG version 2.1), published by the Web Accessibility Initiative (WAI) of the World Wide Web Consortium (W3C), which provides a set of principles, guidelines, and success criteria that can be used to evaluate the accessibility of content. With respect to the success criteria, the WCAG 2.1 standard provides multiple levels of conformance (i.e., levels A, AA, and AAA) that can be achieved by satisfying the success criteria associated with each given level.

The WCAG 2.1 success criteria take various forms and may correspond to the design of visual elements in a way that has the effect of addressing the accessibility challenges associated with one or more different types of impairments. As one example, the success criteria may designate a minimum contrast level for different types of visual content, (e.g., text, buttons, etc.), where higher conformance levels have a higher minimum contrast level. As another example, the success criteria may designate a minimum target size (e.g., in pixels) for pointer inputs, where higher conformance levels have a higher minimum target size. As yet another example, the success criteria may require that users are able to pause, stop, or hide certain types of moving, blinking, or scrolling content. Numerous other examples of success criteria from WCAG 2.1 and other accessibility design standards are also possible.

Some governmental agencies and businesses worldwide have embraced accessibility standards and require compliance with a given WCAG 2.1 level for the designers and creators of their own web-based content. However, implementation of WCAG 2.1 and similar guidelines in the design and creation of web-based content remains a complex undertaking and attaining accessibility-compliance is challenging. Consequently, many current content creation workflows include little or no consideration of accessibility design, and the resulting content created by such workflows is often not accessibility-compliant in various ways. Further, many content creation workflows that do consider accessibility design do so in a post-hoc manner, evaluating already-created content and then adjusting the content as necessary to try to achieve some degree of accessibility-compliance.

A simplified example of this type of arrangement is shown in FIG. 1, which depicts a block diagram of the logical entities and operations that may be involved in a typical content creation workflow. At a high level, FIG. 1 may include a first computing device 101 that corresponds to a designer, a second computing device 102 that corresponds to a developer, a third computing device 103 that corresponds to a content creator, a fourth computing device 104 that corresponds to a content publishing system, and a fifth computing device 105 that corresponds to an impaired user.

In general, the designer may, via the first computing device 101, define consistent design language components and styles (e.g., colors, fonts, shapes, spacing, etc.) that will be used for the content that is to be created. Thereafter, the developer may, via the second computing device 102, implement the design language defined by the designer using software systems (e.g., interface design tools) to render content components such as buttons, menus, etc. in accordance with the design language. The content creator may then, via the third computing device 103, produce web-based content (e.g., a web page, a mobile application, etc.) using the content components rendered by the developer and then publish the created content to the fourth computing device 104 corresponding to the content publishing system (e.g., a web-hosting service, an app store, etc.). An impaired user may then, via the fifth computing device 105, access the published content.

It should be noted that FIG. 1 illustrates just one example arrangement of users and computing devices that might make up a content creation workflow and that numerous variations are possible. For example, the content creation workflow may include additional intermediate computing devices and users that are not shown. Further, any of the activities noted above may be performed by the same user (e.g., the developer and the content creator may be the same person) or by multiple users (e.g., there may be multiple designers, developers, and/or content creators. Similarly, any combination of the computing devices in FIG. 1 might be represented by a single device or may take the form of multiple computing devices and/or computing systems. In particular, the fourth computing device 104 corresponding to the content publishing system may take the form of one or more computing systems within a distributed computing network.

As depicted in the example shown in FIG. 1, many content creation workflows do not introduce any evaluation of accessibility compliance until after the content is already created, as represented by logical block 106. In this regard, any one of the computing devices shown in FIG. 1 or a separate computing device may perform an audit of the published content by comparing it against the success criteria of WCAG 2.1 (or a similar standard) to determine what level of compliance, if any, the content satisfies.

If the required success criteria are not satisfied, one of more of the designer, the developer, and/or the content creator may be required to revisit their respective portions of the content creation workflow, depending on which success criteria were not satisfied and the specific reason(s) why they were not satisfied. For instance, the developer may be required to redevelop, at block 108, certain components of the content in an accessibility-compliant way (e.g., increasing contrast for certain items by choosing a different color from the design language color palette, increasing the size of certain target input areas, etc.), which must then be recreated, at block 109, by the content creator. Additionally, or alternatively, it may be determined that the designer may need to redesign, at block 107, certain elements of the design language to meet some success criteria (e.g., by selecting different colors, fonts, spacing, etc.). Moreover, many of the changes discussed above may have a cascading effect on other elements of the already-published content, which may require further re-work, increased time and cost, and so on.

Still further, the challenges above are multiplied in situations where it is desired to present content according to more than one visual theme using the same design language. As one example, some content providers generate content that can be viewed in both a light theme (sometimes referred to as light mode), where relatively darker elements are presented against a light background, and a dark theme (sometimes referred to as dark mode), where relatively lighter elements are presented against a dark background. As a result, many visual aspects of the content may change when switching between these two themes such that content that is accessibility-compliant in a light theme may no longer be compliant in a dark theme. As just one example, the contrast between various elements of the content may be different, and thus the success criteria related to contrast may need to be re-evaluated, potentially leading to the re-work noted above.

Accordingly, it will be appreciated that not only is achieving accessibility-compliance with WCAG 2.1 and similar success criteria complex, but it can also be difficult or impossible to achieve by a single participant within the logical flowchart of FIG. 1. For these reasons, and in the absence of any requirement for most web-based designers and content creators to adhere to a specific set of guidelines, widespread adoption of accessibility-compliant standards like WCAG 2.1 for the creation of web-based content remains relatively low.

In view of these and other challenges associated with existing approaches to designing and creating accessibility-compliant content, disclosed herein are new techniques that involve the use of accessibility-aware design services that include pre-encoded logic for satisfying one or more accessibility compliance standards, such as WCAG 2.1. Based on some initial design data provided by a designer (e.g., a primary color, etc.), one or more accessibility-aware design services may perform the necessary calculations to generate accessibility-compliant design data that can be used to produce content that meets an accessibility standard specified by the designer.

Moreover, the accessibility-compliant design data that is generated by the accessibility-aware design services is generated such that it is usable in combination with other elements of the content in a compliant way, and is systematically extendible throughout the content while continuing to meet the desired accessibility standards. To facilitate these additional benefits, the accessibility-aware design services discussed herein may be used in conjunction with a set of atomic design principles.

In general, atomic design refers to a methodology whereby the elements of the content to be produced (e.g., a web-based interface) are broken down into their most fundamental building blocks. These building blocks can then be designed and thereafter combined into more complex components and scaled in a consistent way. Typically, there are five levels of complexity in atomic design. First, "atoms" describe the most fundamental aspects of a design that cannot be broken down any further, and include elements such as colors and fonts. "Molecules" are the next level and are made up of groups of atoms in combination. For instance, molecules take the form of relatively simple interface elements such as buttons and form labels. At the next level, "organisms" consist of groups of molecules and/or atoms joined together to form more complex portions of an interface, some examples of which include sidebars, forms, and popups. Next, "templates" describe groups of organisms that are assembled to establish the structure of the eventual content that will be produced, although templates themselves do not include the final content and are often populated with placeholder content. Finally, "pages" refer to a specific instance of a template that includes the final content to be rendered.

It should be noted that the name of the last level of atomic design, "pages," corresponds to the context in which atomic design methodology was first introduced-namely webpage design. However, the need for accessibly-designed content is not limited to webpage design, nor even digital interface design. Rather, the design approach discussed herein can be used for any content that is to be rendered and potentially consumed by an impaired person. This may include non-webpage based content, such as mobile applications, but also physical content such as restaurant menus, tickets, credit cards, identity documents, etc. Similarly, although WCAG 2.1 is a digitally-focused standard, many of the principles, guidelines, and success criteria are directly translatable to the rendering of physical content. Accordingly, the last level of atomic design as applied herein for accessibility may alternatively be referred to as "instruments" and may encompass content that is rendered either digitally or physically.

Utilizing the atomic design methodology noted above in the context of accessibility, the accessibility-aware design services discussed herein may be pre-encoded with logic for satisfying one or more accessibility compliance standards at the level of atoms and molecules. Accordingly, accessibility-compliant atoms and molecules may be combined to form compliant organisms and eventually compliant templates for the eventual instruments. In this way, accessibility-compliance may consistently scale throughout the overall design of the content. In some implementations, a set of accessibility-aware design services may be incorporated into a theme builder tool that guides designers and/or developers through the creation of a foundational set of accessibility-compliant, baseline atoms for a given theme, from which accessibility-compliant molecules, organisms and templates for the given theme can be generated, edited, and previewed.

As one illustrative example, a designer may utilize an accessibility-aware design service that is encoded with logic for calculating light mode and dark mode color shades. The designer may provide the service with initial design data indicating a primary color that will be used for the content. Further, the designer may specify that WCAG 2.1 compliance level AA should be satisfied. Based on this initial design data, the design service may calculate a set of shades (e.g., from lighter to darker) for the primary color by incrementally adjusting the color's lightness value. The service may then determine, for each determined shade of the primary color, whether light or dark text has a higher contrast against the given shade. If the selected text style (i.e., light or dark) provides a sufficient contrast ratio to meet WCAG 2.1 compliance level AA (i.e., a contrast ratio of 4.5:1), the text style is designated as the "on-color" for the given shade (i.e., the color of any element that will appear on top of the given shade). If the text style with the highest contrast does not meet the minimum WCAG 2.1 contrast ratio, the shade is iteratively lightened (for dark text) or darkened (for light text) until the contrast ratio is satisfied. After the accessibility-compliant design data for the primary color shades and on-color for each shade are established, the same design service may perform a similar set of operations for a secondary color provided by the user. Thereafter, this accessibility-compliant design data for the primary and secondary colors may be used in the creation of accessibility-compliant molecules and organisms, and so on. Numerous other examples are also possible, some of which will be discussed in further detail below.

By combining the principles of atomic design with the principles and guidelines of accessibility standards such as WCAG 2.1, designers and content creators can easily and efficiently produce accessibility-compliant content that improves the quality of life for impaired people, recaptures some of the economic loss that would otherwise result from impaired people being unable to access the content, and beneficially reduces the content owner's risk (e.g., liability risk) associated with the content being non-compliant.

Figure 2:
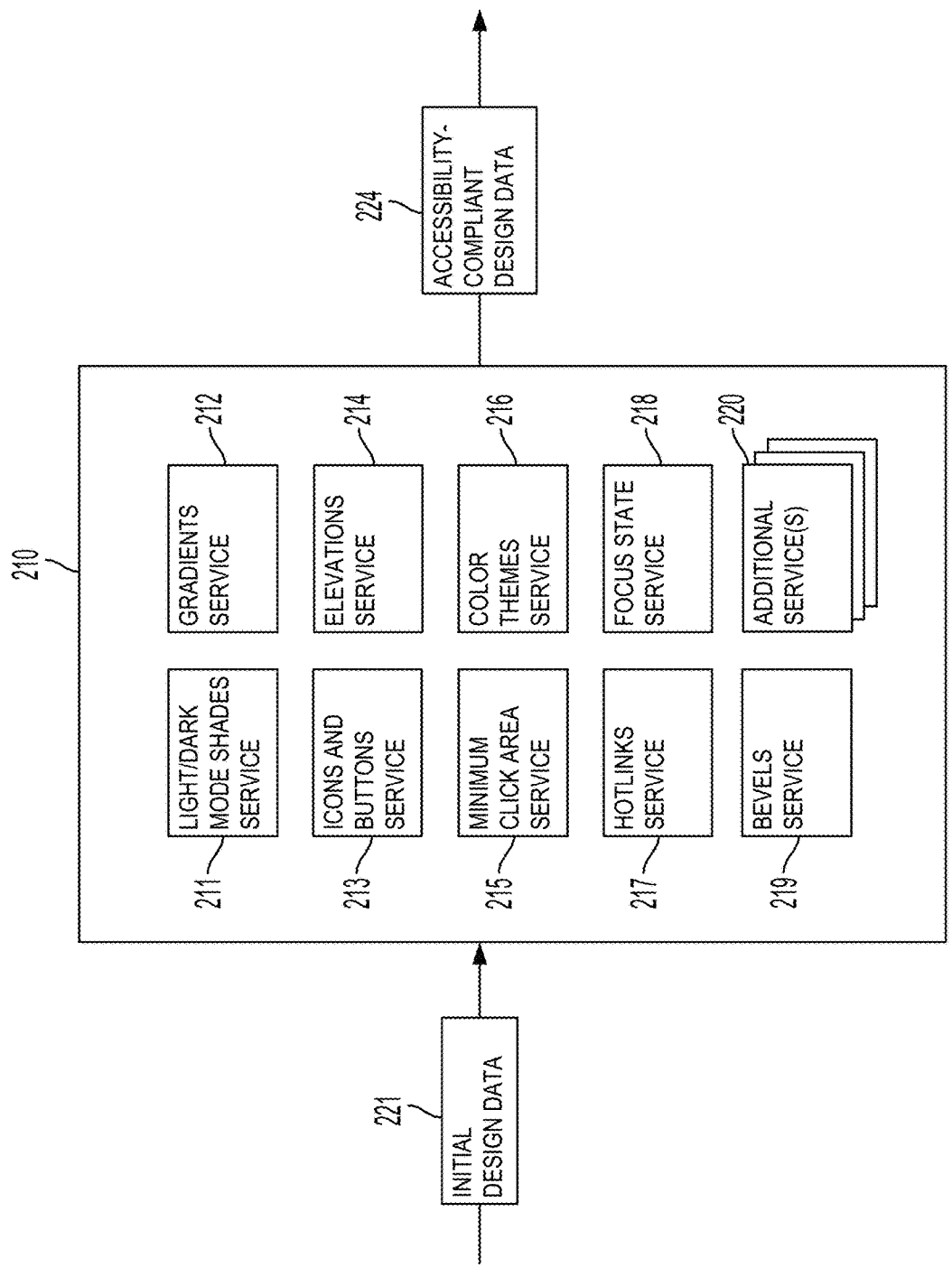
FIG. 2 is a simplified block diagram showing an example computing system that hosts an example set of accessibility-aware design services.

The accessibility-aware design services discussed above may be provided in various ways. One example is shown in FIG. 2, which depicts a simplified block diagram of an example computing system 210 that hosts an example set of accessibility-aware design services that each correspond to a different atomic design element. In FIG. 2, each service takes the form of a subsystem of the overall computing system 210, although other arrangements are also possible. At a high level, each subsystem of the computing system 210 may be configured to receive as input some initial design data 221 and generate as output accessibility-compliant design data 224. Although the initial design data 221 is illustrated in FIG. 2 as being an external input to the computing system 210 (e.g., provided by a designer), in some cases a first subsystem (e.g., running an atom-generation service) may produce accessibility-compliant design data 224 that is used as initial design data 221 by a second subsystem (e.g., running a molecule-generation service). The pictured subsystems, which will be discussed in further detail below, include a first subsystem 211 that runs a light and dark mode shade service, a second subsystem 212 that runs a gradients service, a third subsystem 213 that runs an icons and buttons service, a fourth subsystem 214 that runs an elevations service, a fifth subsystem 215 that runs a minimum click area service, a sixth subsystem 216 that runs a color themes service, a seventh subsystem 217 that runs a hotlinks service, an eighth subsystem 218 that runs a focus state service, and a ninth subsystem 219 that runs a bevels service. Various other subsystems 220 are also possible and may run other accessibility-aware design services corresponding to other atomic design elements.

In some implementations, the example set of accessibility-aware design services shown in FIG. 2 may form part of a theme builder tool that is provided by the computing system 210. As discussed above, the theme builder tool may guide designers and/or developers through the creation of a foundational set of accessibility-compliant, baseline atoms for a given theme, using one or more of the accessibility-aware design services shown in FIG. 2. As discussed in further detail with respect to FIGS. 3-14, the theme builder tool may use the calculations provided by the accessibility-aware design services, in conjunction with various designer inputs, to define the components (e.g., atoms, molecules, organisms, etc.) of a particular design theme, facilitate designer edits to these components (e.g., within a target accessibility compliance standard), and dynamically display a visual preview of the components for the designer's review.

Further, for each design component that is defined, the theme builder tool may generate a set of accessibility-compliant design data. For example, the accessibility-compliant design data may take the form of a cascading style sheet (CSS) file or a javascript object notation (JSON) file, among other examples, which may be used by the designer at computing system 210 or provided to a different designer using an interface design tool on a separate computing system. In some cases, the accessibility-compliant design data may be the accessibility-compliant design data 224 shown in FIG. 2 that is the direct output of one of the accessibility-aware design services. In other cases, the accessibility-compliant design data may be a composite set of accessibility-compliant design data that is based on outputs from multiple design services and/or additional inputs from a user editing the design data within the parameters of the target accessibility compliance standard.

In practice, the computing system 210 may be implemented using various different techniques. For example, the computing system 210 may be implemented in part using a service-oriented architecture (SOA) where one or more of the subsystems communicate via an enterprise service bus (ESB). As another example, the computing system 210 may be implemented in part using a microservices architecture where one or more of the subsystems are deployed in containers and communicate using respective APIs. As yet another example, one or more of the subsystems shown in FIG. 2 may utilize a serverless architecture where the given subsystem is implemented as a set of cloud-based functions that may only be run when another subsystem accesses its API. As suggested above, the computing system 210 may integrate aspects of any of these various architectures, among others, in any combination.

The physical instantiation of the software subsystems included as part of the computing system 210 may also take various forms. In this regard, it should be noted that the physical hardware (e.g., servers, processors, communication interfaces, etc.) that makes up the subsystems of the computing system 210 might not be organized along the same lines as the individual subsystems. For example, a given subsystem may be collectively implemented by two or more physically distinct computing systems. Conversely, a single computing system might implement two or more logically separate subsystems (e.g., within separate containers or virtual machines) using the same physical hardware. Further, each software subsystem may include a network-accessible interface that allows other computing devices, systems, and/or subsystems-both internal and external—to access it over a network. A given subsystem's network-accessible interface may take various forms, such as an application programming interface (API), among other possibilities depending on the implementation. Some of the structural components of the computing systems(s) that might constitute the computing system 210 are discussed further below in relation to FIG. 14.

Further, although the computing system 210 shown in FIG. 2 has been described as providing both the theme builder tool and the set of accessibility-aware design services as part of the theme builder tool, other arrangements are also possible. For example, the theme builder tool may run on a computing device (e.g., a designer's computing device 101 or a developer's computing device 102 shown in FIG. 1) that is separate from, but in communication with, the computing system 210. The computing device may receive inputs from the designer and transmit input data to the computing system 210 (e.g., the input data 221), which may in turn transmit accessibility-compliant design data (e.g., the accessibility-compliant design data 224) back to the designer's computing device, where it may then be used by the theme builder tool. Other possibilities also exist.

As noted above, the accessibility-aware design services discussed herein may take various forms, several examples of which are shown in FIG. 2. Beginning with subsystem 211, a light and dark mode shades service ("shades service") may be provided. At a high level, the light and dark mode shades service is an atom generation service that, given an indication of an initial input color from a designer, applies a set of logical instructions for creating ten light mode shades for the input color, ten dark mode shades for the input color, and a corresponding on-color for each shade that meets a designated accessibility guideline. For example, WCAG 2.1 requires an on-color contrast ratio of 4.5:1 to meet conformance level AA and a contrast ratio of 7:1 to meet conformance level AAA. In this regard, the desired conformance level may form part of the input data that is provided by the designer and the service may determine the required contrast ratio to use.

Once the light and dark mode shades have been determined, each shade is then checked against default light and dark text to determine which has a higher contrast with respect to the shade. If the higher-contrast text results in a contrast ratio is greater than the minimum value indicated by the desired WCAG 2.1 conformance level (e.g., 4.5:1), then that text may be designated as the on-color for that shade whenever the shade is used during content creation. Alternatively, if the higher-contrast text for a given shade does not have a contrast-ratio greater than the minimum value required, the shades service may incrementally lighten (for dark text) or darken (for light text) the shade to increase the contrast until the minimum contrast ratio is met.

Lastly, if any of the ten light mode shades or the ten dark mode shades were lightened or darkened to increase contrast, the shades service may smooth out the transitions through the ten shades so there are no excessive lightness jumps between adjacent shades. For example, the shades service of subsystem 211 may place the lightened or darkened shade along a gradient between the lightest and darkest shades and update the intervening shades in each direction at equal percentage intervals.

Turning to subsystem 212, a gradients service may be provided. At a high level, the gradients service is a molecule generation service that, given an indication of the colors that will be used for a given theme (e.g., primary, secondary, tertiary colors), applies a set of logical instructions for the selection of gradient colors and a complementing set of text and icons colors, such that all text and icons placed over the gradient, with all its varying shades, meet the minimum designated contrast ratio.

Turning to subsystem 213, an icons and buttons service may be provided. At a high level, the icons and buttons service is a molecule generation service that, given an indication of the colors that will be used for a given theme (e.g., primary, secondary, tertiary colors) and the light mode and dark mode background colors, applies a set of logical instructions for selecting icon and button colors that are limited to those colors that will meet the minimum designated contrast ratio against their background.

Turning to subsystem 214, an elevations service may be provided. At a high level, the elevations service is an atom generation service that applies logic for creating respective sets of ten elevations for light mode and dark mode based on a designer's input for a desired box shadow styling.

Turning to subsystem 215, a minimum click area control service may be provided. At a high level, the minimum click area control service is an atom generation service that applies the logic for defining a design system's minimum click area (e.g., in pixels) for pointer inputs. For example, WCAG 2.1 compliance level AA requires a minimum click area of 24 pixels or higher for desktop applications and 44 pixels for tablet and mobile applications.

Accordingly, the minimum click area control service receives input from a designer to set the minimum click area for a design and will increase the minimum click area by default if the value input by the designer does not meet the minimum requirements (e.g., 24 pixels for desktop, 44 pixels for tablet and mobile applications). In addition, the minimum click area control service may include logic for creating buttons and chips that appear visually smaller than the minimum required click area, but nonetheless meet the click area requirements. For instance, in the context of a mobile application with a minimum click area of 40 pixels, a small button that has a visual appearance that is only 28 pixels tall may be contained within a clickable area that is 44 pixels tall, with 8 pixels of padding on the top and bottom of the button. This feature advantageously allows the designer to create visually smaller elements that are less overwhelming in an interface while still meeting accessibility guidelines.

Turning to subsystem 216, a color theme service may be provided. At a high level, the color theme service is a template generation service that, given a previously created template and a new set of desired colors, applies a set of logical instructions for generating a new template that changes only the coloring of the elements in the resulting instrument.

For example, a designer may specify a color theme including primary, secondary and tertiary colors, light and dark mode backgrounds, gradients, buttons, icons, and text gradient colors, as generally discussed with respect to some of the services above. Based on this input data, new light and dark mode themes according to the new color theme may be generated for any existing template. Advantageously, the color theme service may be used to develop a dark mode for an existing template that did not previously have a dark mode, or to otherwise darken an existing template to reduce eye strain while maintaining required contrast levels. In this regard, the color theme service may also adjust the brightness of images by adding on a desaturation layer (a black layer with an opacity of 5%) over the image.

Turning to subsystem 217, a hotlinks service may be provided. At a high level, the hotlinks service is an atom generation service that applies logic for the generation of selectable hotlinks (or hyperlinks) that are discernible to meet a designated accessibility compliance guideline. For example, WCAG 2.1 conformance level AA requires that hotlinks have a contrast ratio of 3.1:1 against the background as well as a contrast ratio of 3.1:1 against the surrounding text if the link is not underlined. The hotlinks service also includes logic for handling various other complexities related to hotlink state and appearance.

Turning to subsystem 218, a focus state service may be provided. At a high level, the focus state service is an instrument generation service that applies logic for creating a focus state for clickable interface items (e.g., buttons). For example, the focus state may include a visual indicator with a contrast of 3.1:1 against the background, as required by WCAG 2.1 conformance level AA.

Turning to subsystem 219, a bevels service may be provided. At a high level, the bevels service is an atom generation service that applies logic for creating varying bevels, reverse bevels, and inset shadow effects based on user input. Bevels are similar to elevations and add the visual effect of 3D depth to a graphic or text object by making a light shadow on the top and left side of a shape and a dark shadow on the right and bottom side of a shape. An inverse bevel applies a dark shadow to the top and right side of a shape making it look three dimensionally recessed.

The additional subsystems 220 of the computing system 210 may run any number of additional design services similar to those discussed above, corresponding to any number of atomic design elements and/or accessibility compliance criteria. Further information regarding accessibility-aware design services noted above can be found in U.S. patent application Ser. No. 1/478,267, filed on Sep. 29, 2023 and entitled "Accessibility-Aware Design Services," which is hereby incorporated by reference in its entirety.

Figure 3:
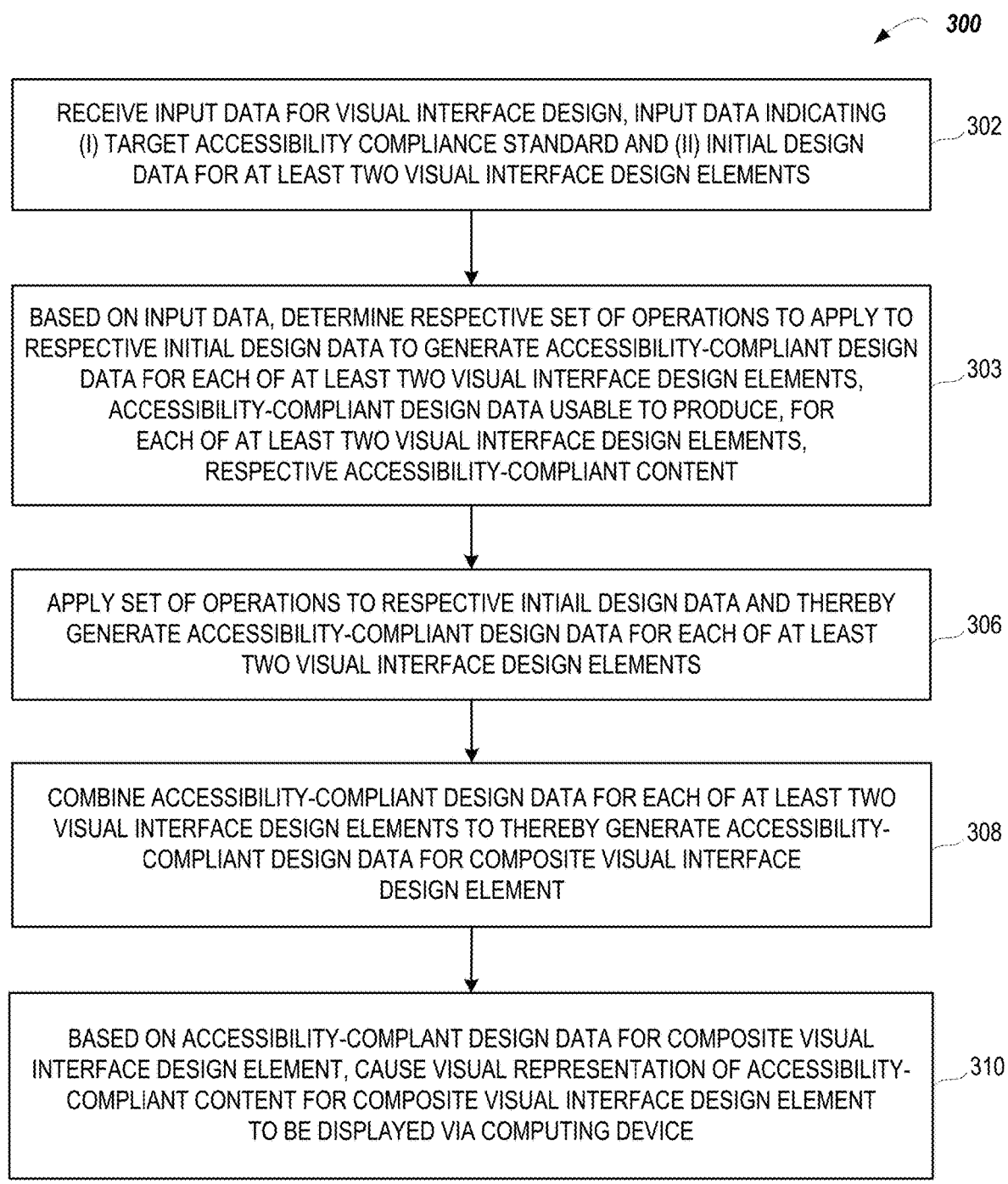
FIG. 3 is a flowchart that illustrates one possible example of a process carried out by an accessibility-aware theme builder tool in accordance with the present disclosure.

Turning to FIG. 3, a flowchart is shown that depicts example operations carried out for the creation of accessibility-compliant design data, which may in turn be used for the creation of accessibility-compliant content. At a high level, FIG. 3 includes various operations that may be carried out by a computing system that includes a theme builder tool that includes one or more accessibility-aware design services, such as the computing system 210 shown in FIG. 1. As another possibility, the various operations shown in FIG. 3 may be carried out by a computing device (e.g., the computing device 101 or 102 shown in FIG. 1) that includes the theme builder tool and is in communication with a computing system the hosts the accessibility-aware design services. Other arrangements are also possible. For purposes of the following examples, the computing system 210 is assumed to include both the theme builder tool and the one or more accessibility-aware design services.

Beginning at block 302, the computing system 210 may receive input data for a visual interface design. For instance, the input data may be provided by a designer who is using the computing system 210. The input data may take various forms and may provide the basis for some or all of the calculations that will be carried out by the computing system 210 to generate the accessibility-compliant design data. As one possibility, the input data may include an indication of a target accessibility compliance standard. For instance, the input data may indicate that WCAG 2.1 compliance level AA is desired for the content that will eventually be created.

As another possibility, the input data may include initial design data for at least two visual interface design elements. In this regard, the visual interface design elements may take various forms, including many of the elements discussed above that is used to define the design language for content creation, such as color palette information (e.g., primary, secondary, tertiary colors, etc.), typography information (e.g., font setting and styles, etc.), shapes (e.g., shapes for buttons, chips, etc.), as well as other display-based elements such as minimum desktop target area (e.g., for a desktop or mobile theme). For each visual interface design element, the initial design data may include an appropriate value such as color (e.g., represented as a hex value), a font style (e.g., selected from a font library) and so on.

As yet another possibility, the input data received by the computing system 210 may provide an indication of at least one user impairment for which the designer is trying to create accessibility-compliant design data, and for which there may be unique accessibility considerations and design guidelines that are not present for other types of impairments. Other examples are also possible.

At block 304, based on the received input data, the computing system 210 may determine a respective set of operations to apply to the respective initial design data to generate accessibility-compliant design data for each of at least two visual interface design elements. The computing system 210 may determine each respective set of operations in various ways and based on various factors. As one possibility, the target accessibility compliance standard included as part of the input data may dictate various minimum standards for contrast ratios, clickable areas, and the like, which in turn may affect the operations that are to be performed on the initial design data. Accordingly, the computing system 210 may utilize one or more of the accessibility-aware design services shown in FIG. 2 to determine a given set of operations in view of the target accessibility compliance standard. As one such example, the computing system 210 may determine, using the light and dark mode shades service 211, a set of operations to apply to an input color provided by the designer in the input data to thereby generate accessibility-compliant color shades and corresponding on-colors for each shade that meet the target accessibility compliance standard.

As another possibility, in situations where the input data received from the designer included an indication of a particular impairment, the computing device 210 may determine a set of operations that are specific to the particular impairment. For instance, if the input data includes an indication of a certain type of color blindness, the light and dark mode shade service 211 may restrict the colors and shades that may be selected for certain types of content.

Additional examples of the operations that may be applied to initial design data to generate accessibility-compliant design data can be found in U.S. patent application Ser. No. 18/478,267, incorporated by reference above.

Figure 9:
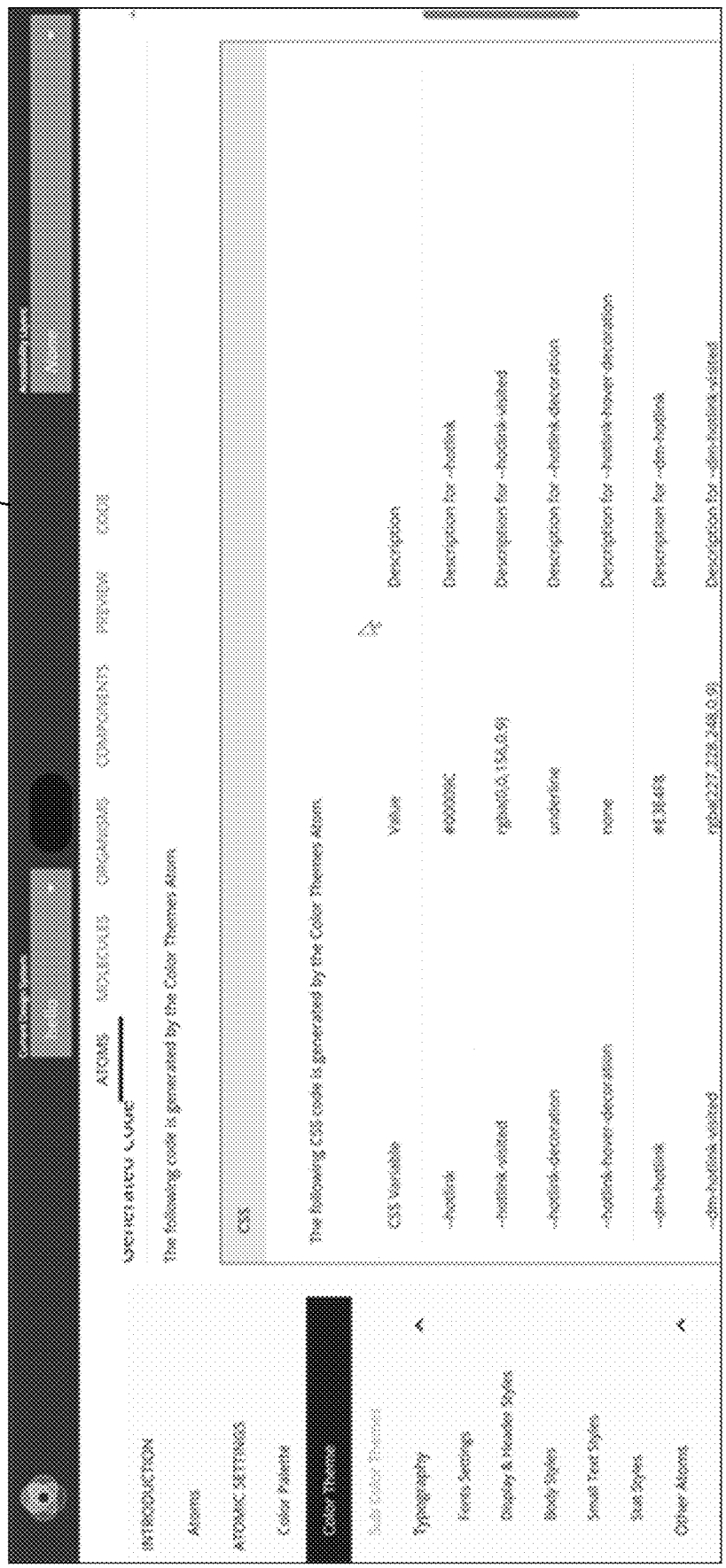
FIG. 9 depicts an example interface view that illustrates accessibility-compliant design data generated by a theme builder tool in accordance with the present disclosure.

At block 306, the computing system 210 may apply each respective set of operations to the respective initial design data and thereby generate the accessibility-compliant design data for each of at least two visual interface design elements. The accessibility-compliant design data may take various forms, although it may typically not include a rendered representation of the content that is the eventual goal of the design. Rather, the accessibility-compliant design data may take the form of a cascading style sheet (CSS) file or a javascript object notation (JSON) file that may be usable by the theme builder tool running on the computing system 210 to render the accessibility-compliant design. One illustrative example of this type of accessibility-compliant design data is shown in FIG. 9 and discussed further below.

Accordingly, the computing system 210 may, based on the accessibility-compliant design data generated for each of the at least two visual interface design elements, cause a visual representation of accessibility-compliant content for each of the at least two visual interface design elements to be displayed via the theme builder tool. In this way, the theme builder tool may provide the designer a preview of what the eventual content that is to be created (e.g., a webpage, a mobile application, a physical item, etc.) will look like, which may allow the designer to evaluate the eventual content and make any accessibility-compliant adjustments that may be desired. Further, the display may be dynamic within the theme builder tool such that any edits that the designer makes to the accessibility-compliant design data for the visual interface design elements are reflected in the visual representation of the accessibility-compliant content in real time.

Figure 10:
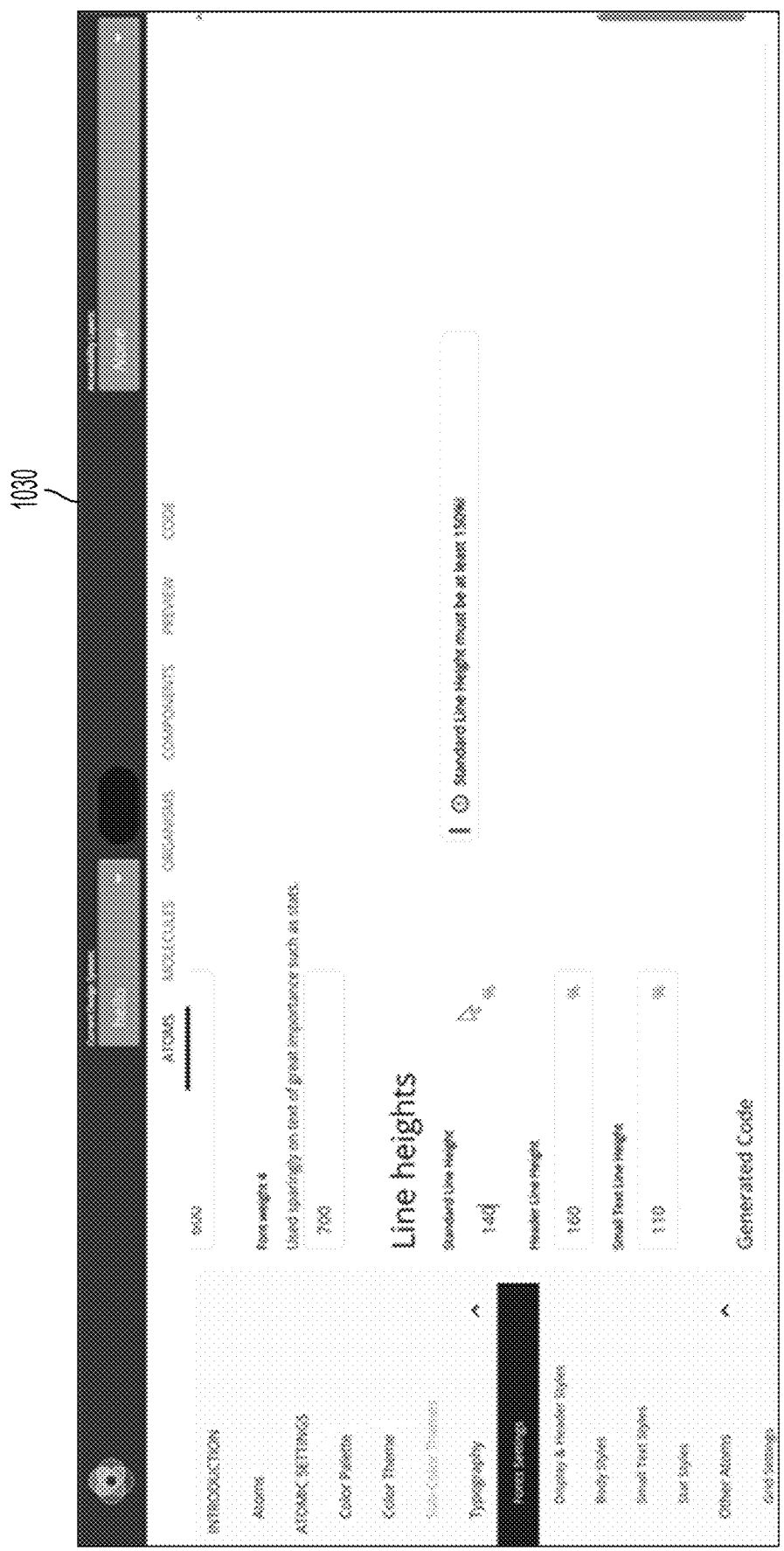
FIG. 10 depicts an example interface view for editing typography atoms using a theme builder tool in accordance with the present disclosure.

In this regard, the designer might only be able to edit the accessibility-compliant design data for the visual interface design elements within the constraints established by the target accessibility compliance standard. If the designer attempts to edit the accessibility-compliant design data in such a way that it would no longer be compliant, the computing system 210 may provide the designer with a notification of the relevant requirement. For instance, if the designer attempts to adjust a line height in a way that would violate a minimum required line height for readability purposes, or to adjust a clickable area of a button below a minimum threshold for pointer inputs, the theme builder tool may display a notification informing the designer of the minimum threshold and possibly resetting the value input by the designer to the minimum allowed value. One illustrative example of this type of notification is shown in FIG. 10 and discussed further below.

Additionally, the computing system 210 may transmit the accessibility-compliant design data for each of the at least two visual interface design elements to one or more other computing devices. Beneficially, this may allow other designers and/or developers to utilize the design data in an interface design tool or the like to generate accessibility-compliant content according to the same theme.

In some implementations, various elements of an accessibility-compliant visual interface design may depend on the accessibility-compliant design data that is generated for other elements. For example, operations that are determined and applied to the initial design data for a second visual interface design element in order to generate the accessibility-compliant design data may be based not only on the initial design data for that element, but also on accessibility-compliant design data that has already been generated for a first visual interface element. As a result, the operations for generating accessibility-compliant design data may need to be applied to the initial design data for certain design elements (e.g., the first visual interface design element) before others (e.g., the second visual interface design element). One illustrative example of this type of sequencing is shown in FIGS. 4-8 and discussed further below.

At block 308, the computing system 210 may combine the accessibility-compliant design data for each of at least two visual interface design elements to thereby generate composite accessibility-compliant design data for a composite visual interface design element. In this regard, the composite visual interface design element may take the form of a button or other molecule that combines the accessibility-compliant design data for at least a first visual interface design element (e.g., a color palette atom) and a second visual interface design element (e.g., a typography atom). Other composite visual interface design elements are also possible, including other molecules, organisms, and templates.

In some implementations, composite accessibility-compliant design data for a composite visual interface design element may additionally be based on input data provided by the designer via the computing system 210. For example, the theme builder tool running on the computing system 210 may guide the designer through providing any additional design data that is needed (e.g., button width, button radius for rounded edges, etc.) to generate the composite accessibility-compliant design data. Other examples are also possible.

At block 310, based on the accessibility-compliant design data for the composite visual interface design element, the computing system 210 may cause a visual representation of accessibility-compliant content for the composite visual interface design element to be displayed. As above, the theme builder tool running on the computing system 210 may display the visual representation to provide the designer with a preview of the composite visual interface design element. As discussed previously, the visual representation may be dynamic such that it reflects, in real time, any adjustments that the designer makes to the composite accessibility-compliant design data.

In view of the above, it will be appreciated that the theme builder tool running on the computing system 210 may be used to generate accessibility-compliant design data for several different themes, depending on the input data. Further, many of the different themes may be combined with one another, or layered, in various combinations to generate accessibility-compliant design data for a specific use case. For example, a designer may generate a default theme for a visual interface design includes accessibility-compliant design data for a desktop application in light mode that satisfies WCAG 2.1 compliance level AA. Alternative themes for the same visual interface design may include a mobile theme instead of a desktop theme, a dark mode theme instead of a light mode theme, and/or a theme that satisfies WCAG 2.1 compliance level AAA. Further, additional themes for the same visual interface design may be added to any combination of the themes mentioned above, including themes that are specific to particular impairment and include more targeted accessibility considerations.

By way of comparison to FIG. 1, it will be appreciated that the accessibility-compliant design data discussed herein is generated to be accessibility-compliant starting from its most fundamental design elements (e.g., atoms and molecules) and is built progressively from there. Accordingly, the designer of computing system 210 or any other user who obtains the accessibility-compliant design data created using the theme builder tool is able to produce accessibility-compliant content according to the defined design language established by the designer and with minimal additional consideration of accessibility standards.

Additionally, the theme builder tool discussed herein may also provide for quick and efficient updates to the generated accessibility-compliant design data based on updates to the input data. For example, consider an example in which an existing theme that satisfies WCAG 2.1 compliance level AA must be updated to instead satisfy WCAG 2.1 compliance level AAA. Under the regime shown in FIG. 1, this would be very challenging, as every design element would need to be re-evaluated against the different requirements of the updated standard, with any changes possibly causing cascading effects throughout the content creation workflow. However, utilizing the theme builder tool discussed herein, the computing system 210 may, based on the updated input data indicating the updated accessibility compliance standard, automatically update the accessibility-compliant design data for the entire theme to meet the elevated requirements. For instance, accessibility-compliant design data for colors and contrast between colors may be updated within color palette atoms, accessibility-compliant design data for line heights and character spacing may be updated within typography atoms, and so on.

To accomplish these automatic updates, the computing system 210 may update the respective sets of operations to apply to the respective initial design data at the atomic level to generate updated accessibility-compliant design data for each visual interface design element that meets the updated accessibility compliance standard. The computing system 210 may then apply each updated set of operations to the initial design data and thereby generate the updated accessibility-compliant design data for each visual interface design element. Further, for the composite visual interface design elements (e.g., molecules, organisms, etc.), the computing system 210 may combine the updated accessibility-compliant design data for each of at least two visual interface design elements to thereby generate updated accessibility-compliant design data for the composite visual interface design elements. In line with the discussion above, the computing system 210 may also cause a visual representation of the updated accessibility-compliant content for the individual interface design elements and the composite visual interface design elements to be displayed, based on the updated accessibility-compliant design data for each respective element.

Numerous other changes to the input data that may result in an automatic theme update are also possible, including changes to the initial design data (e.g., selection of a different primary, secondary, or tertiary color) or an indication of a particular impairment with associated accessibility guidelines. Other examples are also possible.

FIG. 3 includes one or more operations, functions, or actions as illustrated by one or more operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts and communication diagrams shown in FIG. 3 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

Turning now to FIGS. 4-13, various example interface views of a theme builder tool are depicted. The example interface views shown in FIGS. 4-13 may correspond to the theme builder tool discussed above in relation to FIG. 3 and may illustrate the various operations and inputs associated therewith.

Figure 4:
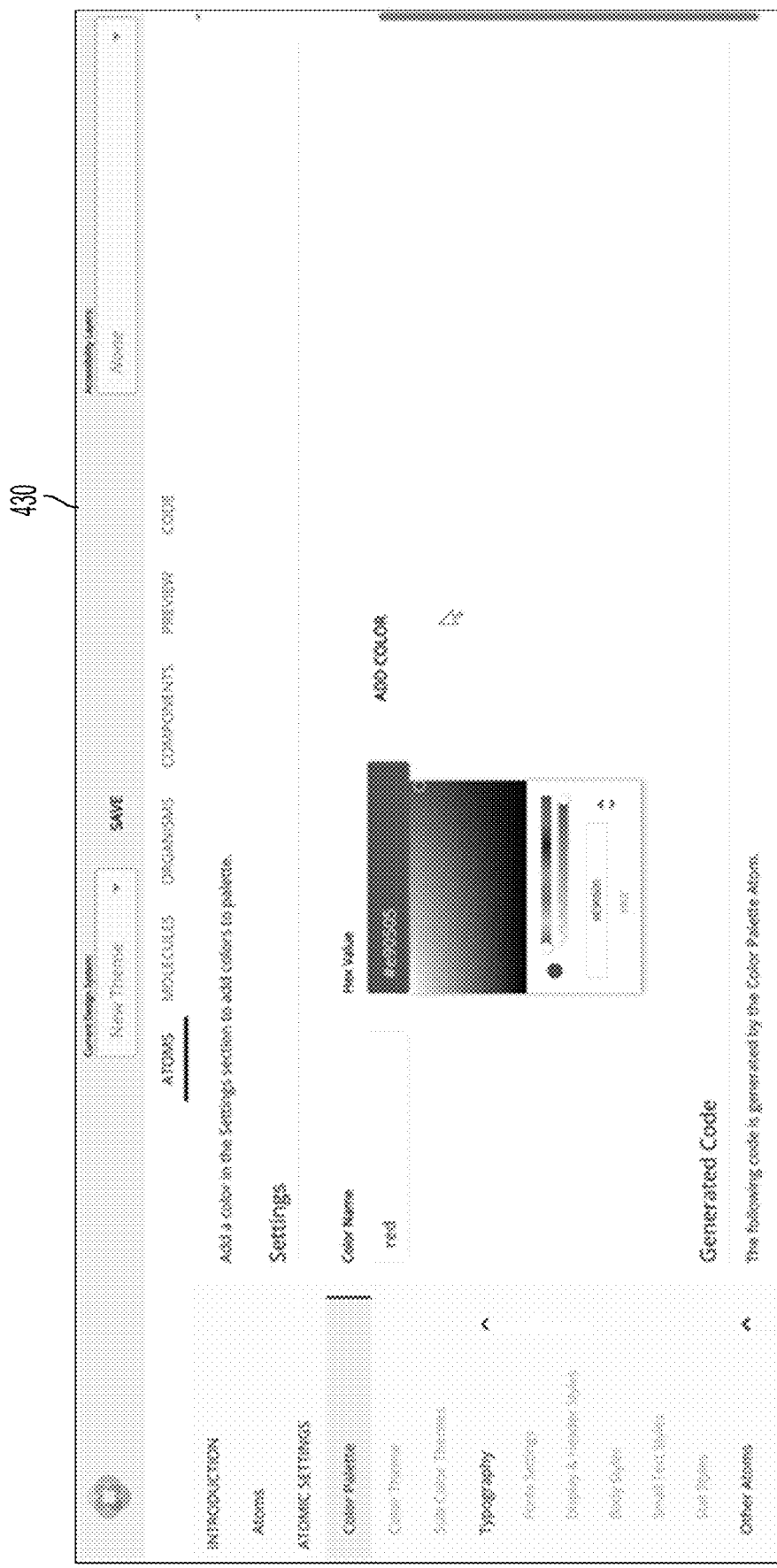
FIG. 4 depicts an example interface view for creation of a color palette using a theme builder tool in accordance with the present disclosure.

FIG. 4 depicts an example interface view 430 for creation of a color palette. In line with the discussion above, FIG. 4 may represent the input of initial design data by a user (e.g., a designer) of the theme builder tool. For instance, the theme builder tool may prompt the designer to input one or more colors that will form the palette from which the colors (e.g., primary, secondary, etc.) for the theme will be selected. As shown in FIG. 4, the designer has selected a color having a given Hex Value and assigned it the name "red." Although not shown in FIG. 4, the designer may also have specified a target accessibility compliance standard within the theme builder tool.

Based on the designer's color selection, the theme builder tool may determine a set of operations to apply to the selected color to generate an accessibility-compliant set of shades for the selected color, each with an on-color (i.e., the color of the depicted text displayed within each shade) that meets the contrast requirements of the target accessibility compliance standard. For example, the theme builder tool may utilize an accessibility-aware design service, such as the light and dark modes shades service 211 shown in FIG. 2, to determine the set of operations.

Figure 5:
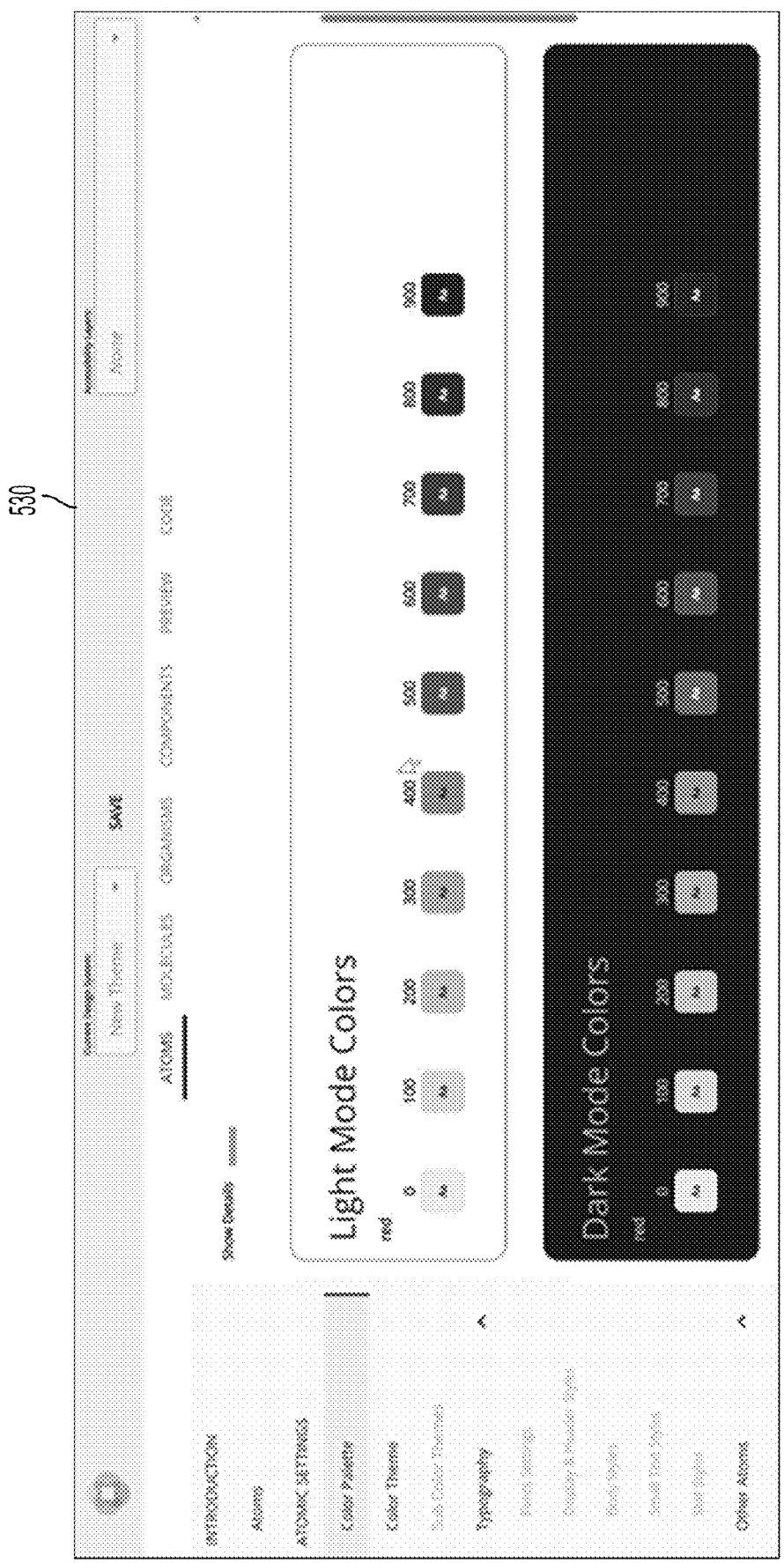
FIG. 5 depicts another example interface view for creation of a color palette using a theme builder tool in accordance with the present disclosure.

The result of applying these operations to the selected color is shown in the example interface view 530 of FIG. 5, which depicts a set of ten light mode shades and ten dark mode shades for the selected color, each with a determined on-color that meets the contrast requirements of the target accessibility compliance standard. The designer may select additional colors for the color palette as shown in FIG. 4, and the theme builder tool may generate a similar array of light mode and dark mode shades for each selected color.

Figure 6:
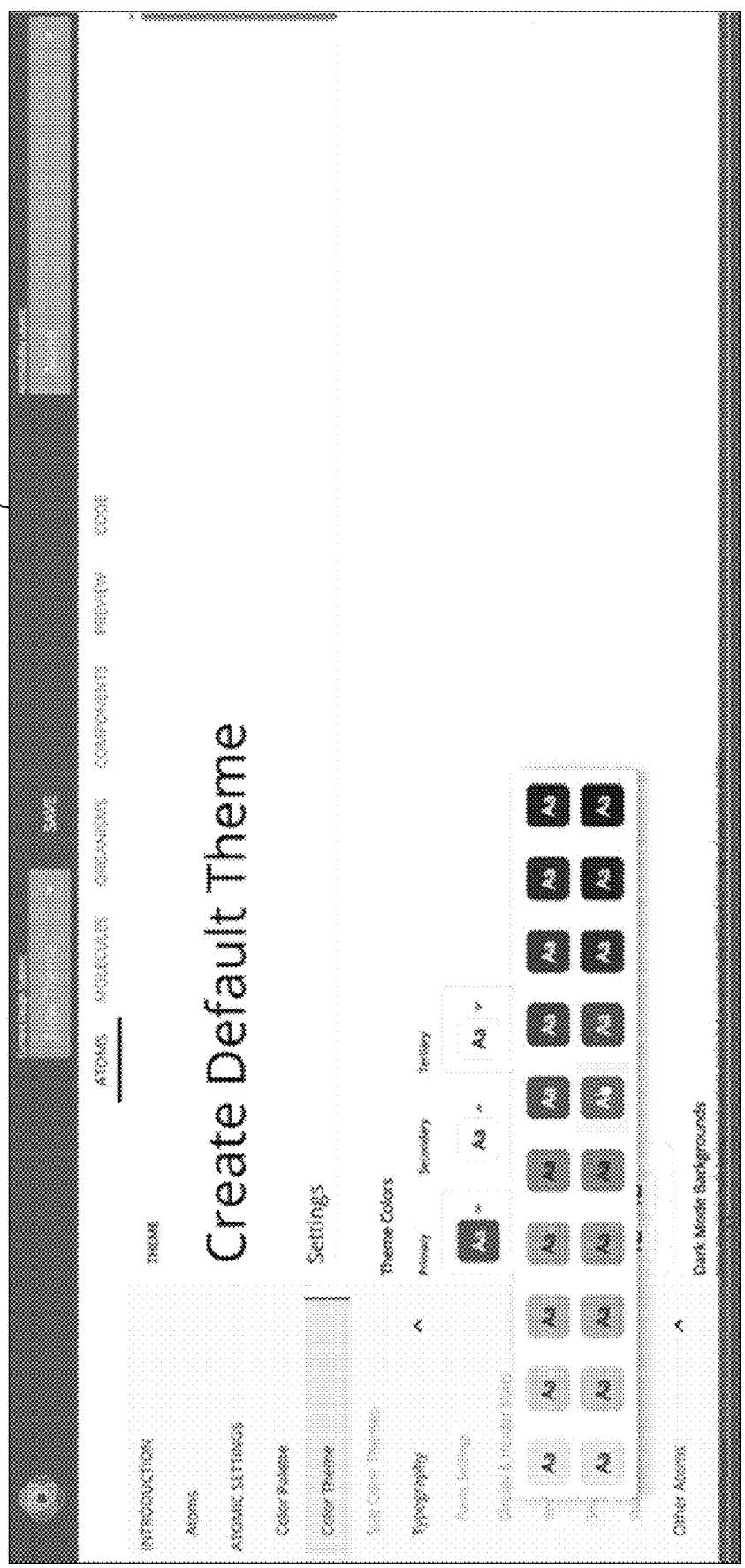
FIG. 6 depicts an example interface view for creation of a color theme using a theme builder tool in accordance with the present disclosure.

FIG. 6 depicts an example interface view 630 for creation of a color theme based the color palette that was created according to the FIGS. 4 and 5. As shown in FIG. 6, the theme builder tool may prompt the designer to select, from the various shades that were generated for all selected colors, a primary, secondary, and tertiary color for a default color theme. Further, as the theme colors are selected, the appearance of the theme builder tool is updated to reflect the designer's selections. For example, the banner at the top of the theme builder tool in FIG. 6 corresponds to the selected primary color, which is an intermediate shade of the originally selected color that the designer labeled "red."

Figure 7:
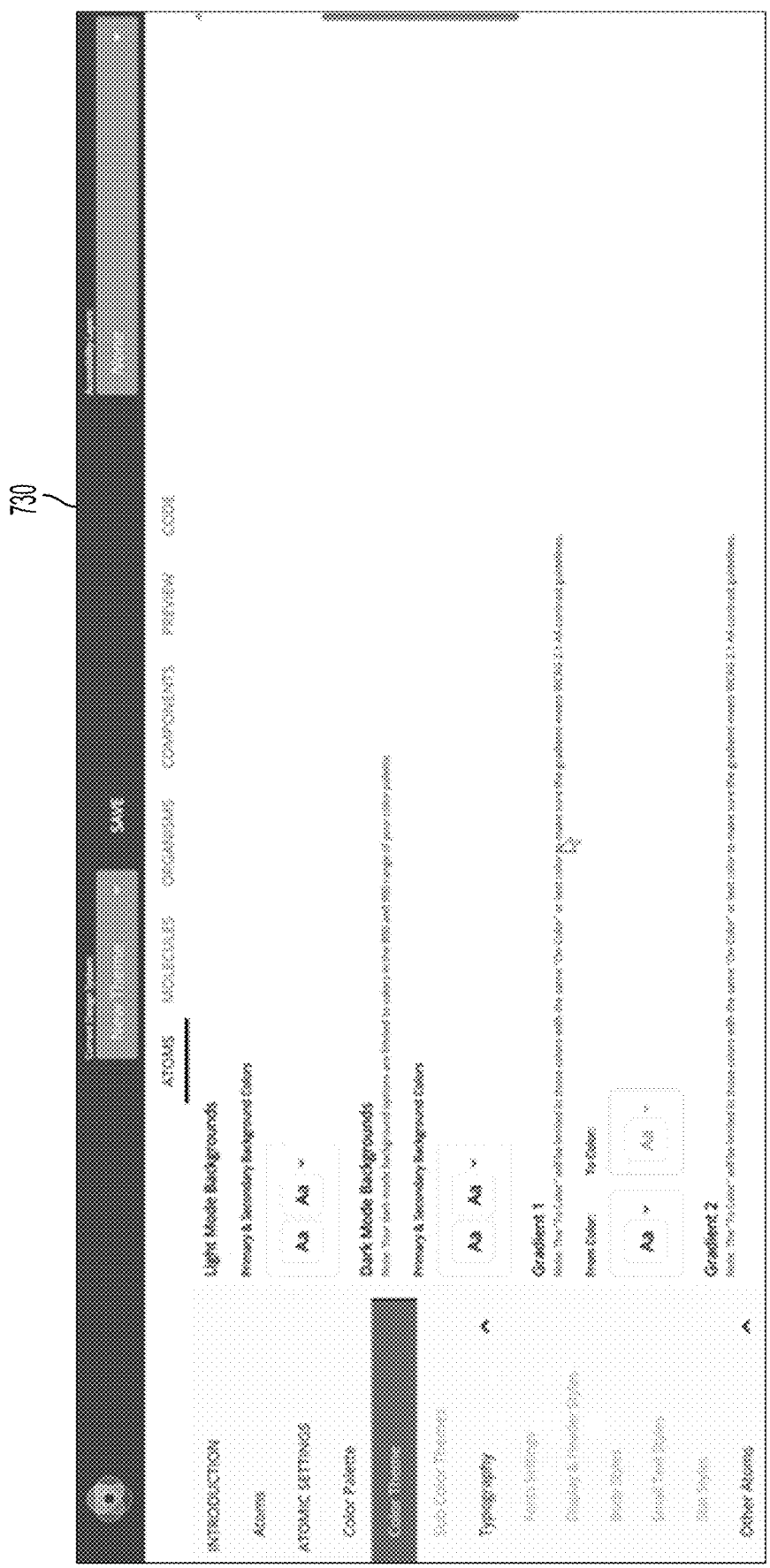
FIG. 7 depicts another example interface view for creation of a color theme using a theme builder tool in accordance with the present disclosure.

FIG. 7 depicts another example interface view 730 for creation of the color theme, illustrating additional selections that the theme builder tool may prompt the designer to make. For example, the theme builder tool may prompt the designer to select light mode and dark mode background colors and gradient colors, button colors, and icon colors, among other examples. In some implementations, the theme builder tool may provide a notification of any relevant restrictions that may be applicable based on one or both of the target accessibility compliance standard or the initial design data (e.g., a previously selected color). For instance, the example interface view 730 includes a notification that the dark mode background options are limited to colors in the 800 or 900 range of the color palette. Further, the example interface view 730 includes a notification that the "To Color" for each gradient will be limited to those colors with the same on-color as the "From Color" in order to meet contrast guidelines. Other examples are also possible.

Figure 8:
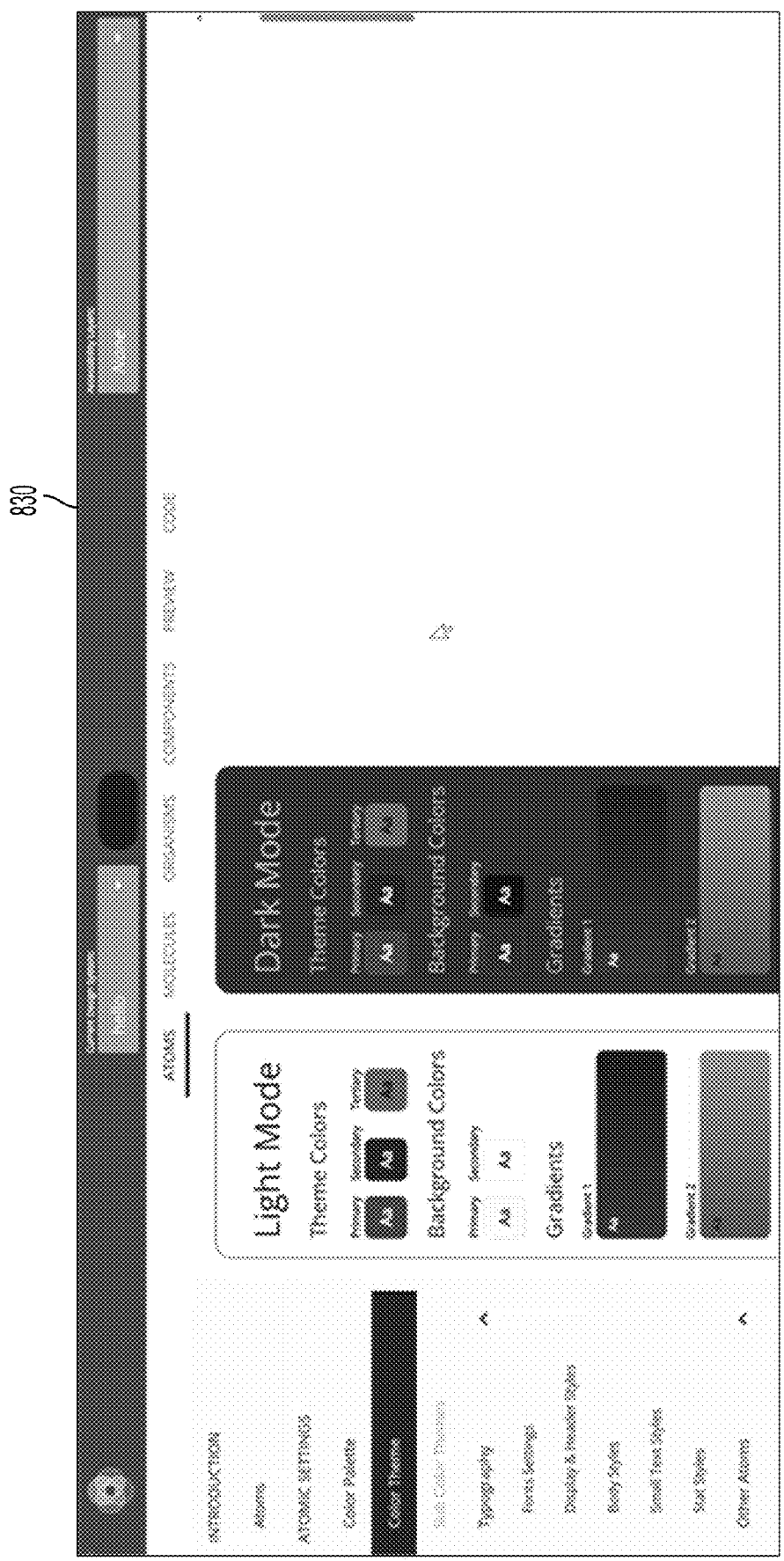
FIG. 8 depicts another example interface view for creation of a color theme using a theme builder tool in accordance with the present disclosure.

FIG. 8 depicts another example interface view 830 for creation of a color theme, in which a visual preview of some of the interface elements for both the light mode color theme and the dark mode color theme created by the designer are displayed. To generate the visual representation of the interface elements for the color theme as shown in FIG. 8, the theme builder tool generates the accessibility-compliant design data that may be used to create content according to the newly created theme.

An example of this data is shown in FIG. 9, which illustrates an example interface view 930 of the theme builder tool. In FIG. 9, the accessibility-compliant design data for the color theme shown in FIG. 8 is presented as a set of CSS variables with a corresponding set of values based on the designer's selections. As discussed above, this accessibility-compliant design data may be used by the designer and/or exported to one or more other computing devices to be used for the creation of accessibility-compliant content that adheres to the generated theme.

The theme builder tool may also provide the designer with the ability to edit various atoms of the theme, within the limitations of the target accessibility compliance standard. For instance, FIG. 10 depicts an example interface view 1030 for editing typography atoms within the theme that is shown in FIGS. 8 and 9. For instance, the designer may edit the setting for various typography settings, including font styles, font sizes, light heights, and the like. Similar to the discussion above, the theme builder tool may notify the designer of any relevant limitations to each of these settings, including displaying a notification if the designer adjusts a setting to a non-compliant value. An example of such a notification is shown in FIG. 10, indicating that the standard line height must be at least 150%, in response to the designer's attempt to lower the value below this threshold. Other examples are also possible.

Figure 11:
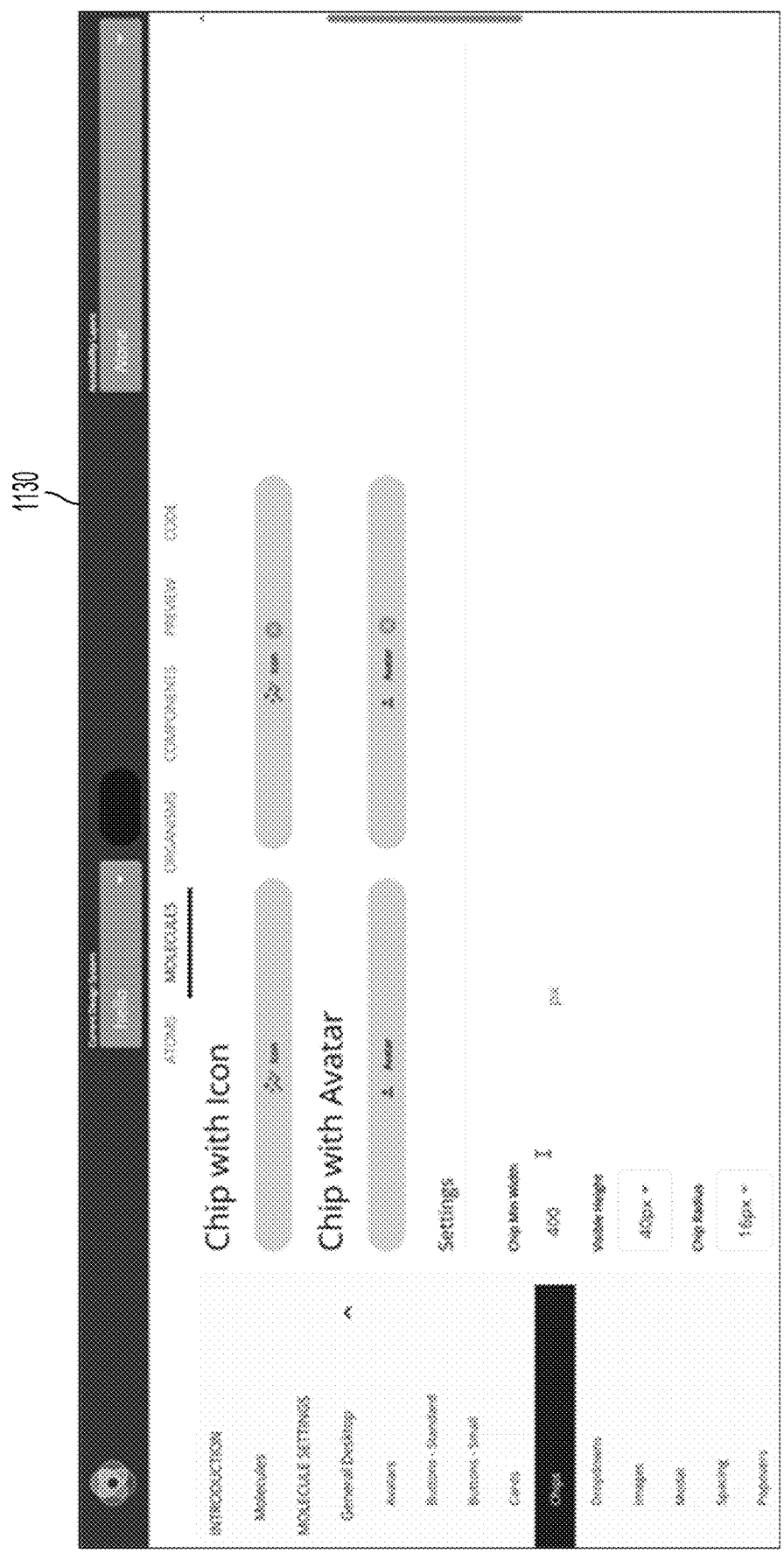
FIG. 11 depicts an example interface view for editing chips molecules using a theme builder tool in accordance with the present disclosure.
Figure 12:
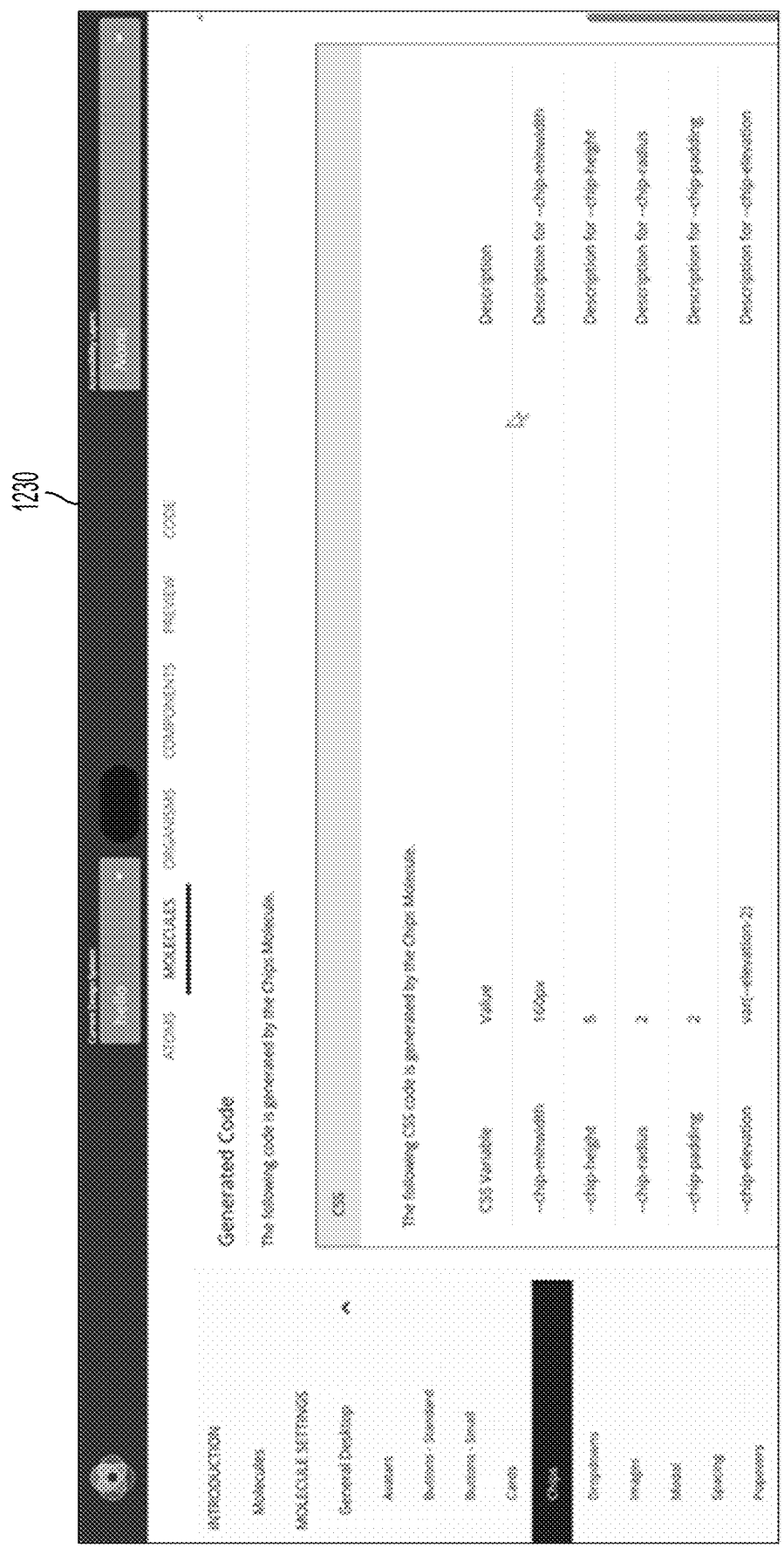
FIG. 12 depicts another example interface view that illustrates accessibility-compliant design data generated by a theme builder tool in accordance with the present disclosure.

Turning to FIG. 11, an example interface view 1130 for editing chips molecules for the theme is shown. In this regard, a chips molecule may represent an example of a composite visual interface design element that includes a combination of the accessibility-compliant design data for multiple different design elements. For instance, the visual representation of the chips shown in FIG. 11 incorporates aspects of the color theme atom (e.g., a color from the generated color palette) and the typography atom (e.g., font style and size) discussed above, as well user-specified inputs establishing the width and height of the chips. Accordingly, the accessibility-compliant design data corresponding to the chips molecule, which is shown in FIG. 12 in the example interface view 1230, may be composite accessibility-compliant design data that includes a combination of the accessibility-compliant design data for the elements noted above. Numerous other examples of molecules and organisms that are created from the combination of two or more atoms and/or molecules are also possible.

Figure 13:
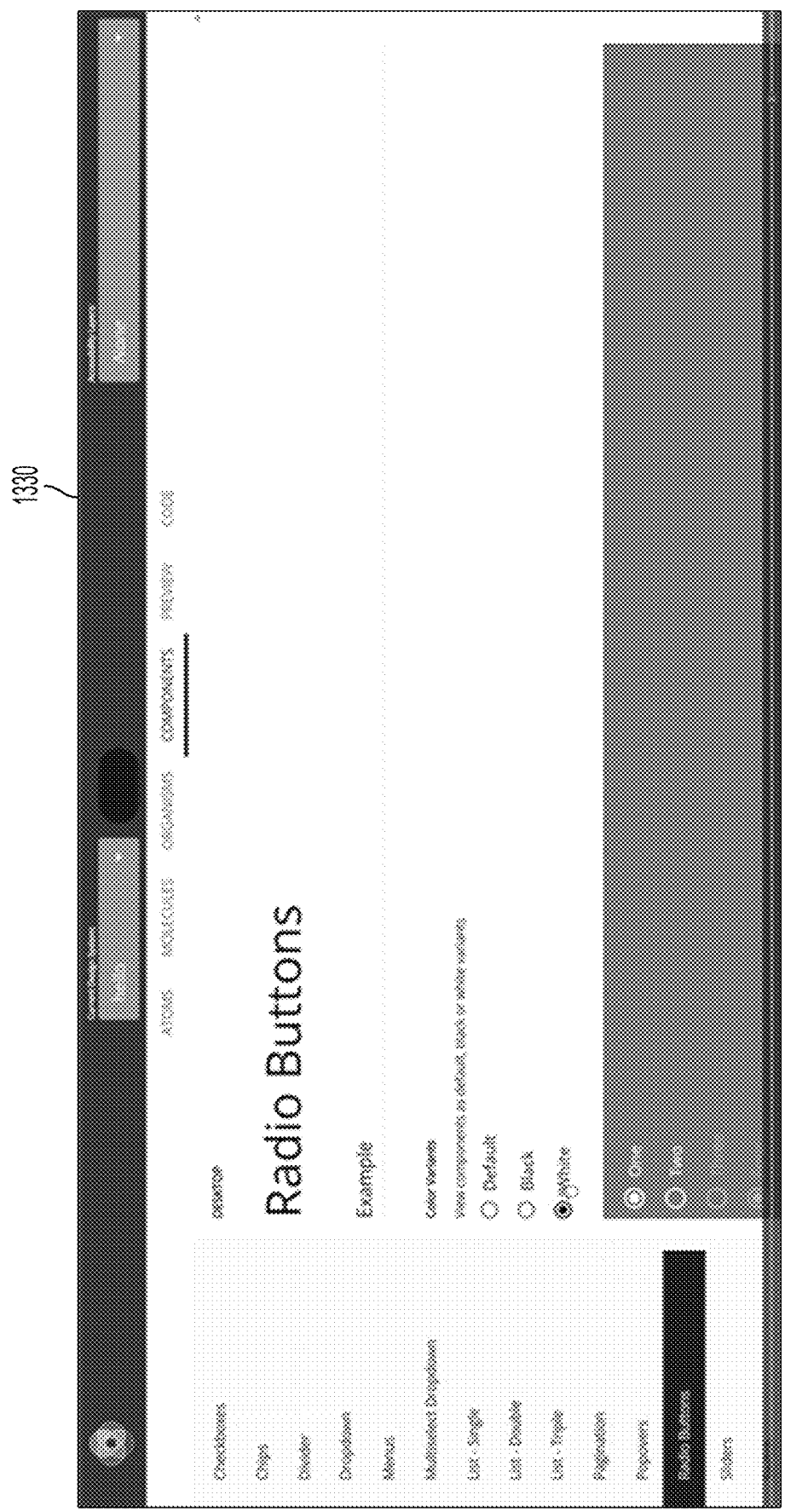
FIG. 13 depicts another example interface view for previewing atomic design components generated by a theme builder tool in accordance with the present disclosure.

FIG. 13 depicts another example interface view 1330 for previewing the various atomic design components generated by the theme builder tool, after the designer has finished changing values within the theme. For example, the theme builder tool may use the accessibility-compliant design data generated during the theme building operations to present a visual representation of the various molecules or organisms that are part of the theme. As shown in FIG. 13, the theme builder tool provides a preview of a radio buttons component, utilizing the accessibility-compliant design data for various atoms including color palette, typography, buttons, and so on.

Figure 14:
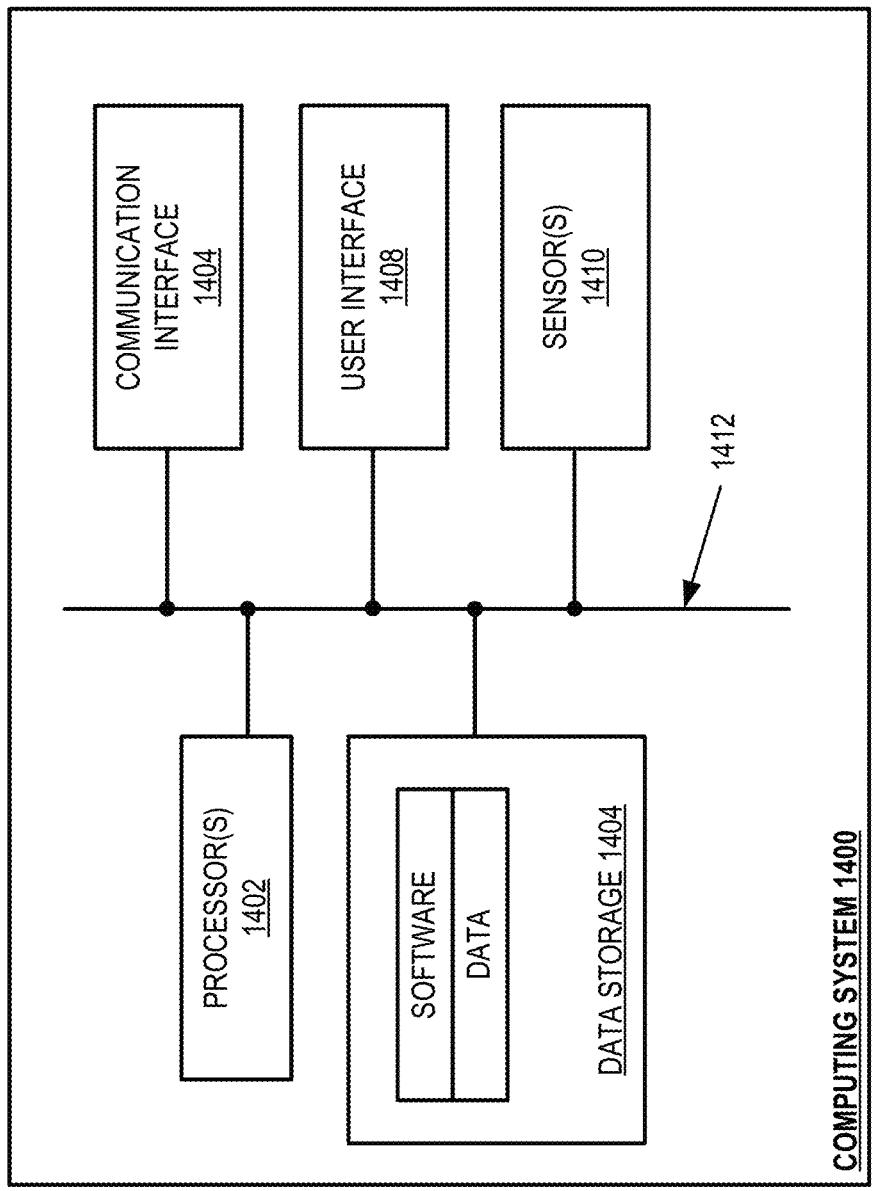
FIG. 14 is a simplified block diagram that illustrates some structural components that may be included in an example computing system.

Turning now to FIG. 14, a simplified block diagram is provided to illustrate some structural components that may be included in an example computing system 1400. For example, computing system 1400 may implement one or more of the software subsystems 211-220 shown in FIG. 2 and may be configured to carry out any of the functions disclosed herein, including but not limited to the functions included in the example flowchart described with reference to FIG. 3. At a high level, computing system 1400 may generally comprise a processor 1402, data storage 1404, a communication interface 1406, a user interface 1408, one or more sensors 1410, all of which may be communicatively linked by a communication link 1412 that may take the form of a system bus or some other connection mechanism. Each of these components may take various forms.

For instance, processor 1402 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 1402 could comprise processing components that are distributed across a plurality of physical computing devices connected via a network, such as a computing cluster of a public, private, or hybrid cloud.

In turn, data storage 1404 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 1404 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 14, data storage 1404 may be capable of storing both (i) program instructions that are executable by processor 1402 such that the computing system 1400 is configured to perform any of the various functions disclosed herein, and (ii) data that may be received, derived, or otherwise stored by computing system 1400.

Communication interface 1406 may take the form of any one or more interfaces that facilitate communication between computing system 1400 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols (e.g., Bluetooth, near field communications (NFC), ultra-wideband (UWB)), among other possibilities.

The computing system 1400 may additionally include a user interface 1408 for connecting to user-interface components that facilitate user interaction with the computing system 1400, such as a keyboard, a mouse, a trackpad, a display screen, a touch-sensitive interface, a stylus, a virtual-reality headset, and/or speakers, among other possibilities.

The computing system 1400 may additionally include one or more sensors 1410 for obtaining various different types of data that may facilitate user interaction with the computing system 1400 or other computing device functions, such as a camera, a microphone, and/or a fingerprint sensor, among other possibilities.

It should be understood that computing system 1400 is one example of a computing device that may be used with the embodiments described herein. Numerous other arrangements are possible and contemplated herein.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "consumers," "holders," "users" or other entities, this is for purposes of example and explanation only. The claims should not be construed as requiring action by such actors unless explicitly recited in the claim language.

The invention claimed is:

1. A computing system comprising:
a network interface for communicating over at least one data network;
at least one processor;
data storage comprising at least one non-transitory computer-readable medium; and
program instructions stored on the at least one non-transitory computer-readable medium that are executable by the at least one processor such that the computing system is configured to:
receive input data for a visual interface design, the input data comprising:
a target accessibility compliance standard; and
initial design data for at least two visual interface design elements;
based on the input data, determine a respective set of operations to apply to the respective initial design data to generate accessibility-compliant design data for each of the at least two visual interface design elements, the accessibility-compliant design data usable to produce, for each of the at least two visual interface design elements, respective accessibility-compliant content;
apply each respective set of operations to the respective initial design data and thereby generate the accessibility-compliant design data for each of the at least two visual interface design elements;
combine the accessibility-compliant design data for each of the at least two visual interface design elements to thereby generate composite accessibility-compliant design data for a composite visual interface design element, the composite accessibility-compliant design data usable to produce, for the composite visual interface design element, accessibility-compliant content; and
based on the accessibility-compliant design data for the composite visual interface design element, cause a visual representation of accessibility-compliant content for the composite visual interface design element to be displayed.

2. The computing system of claim 1, wherein the initial design data for at least two visual interface design elements comprises first initial design data for a first visual interface design element and second initial design data for a second visual interface design element, and wherein the program instructions that are executable by the at least one processor such that the computing system is configured to (i) determine a respective set of operations to apply to the respective initial design data to generate accessibility-compliant design data for each of the at least two visual interface design elements and (ii) apply the set of operations to the respective initial design data and thereby generate the accessibility-compliant design data for each of the at least two visual interface design elements comprise program instructions that are executable by the at least one processor such that the computing system is configured to:
based on the input data, determine a first set of operations to apply to the first initial design data;
apply the first set of operations to the first initial design data and thereby generate first accessibility-compliant design data;

based on (i) the input data and (ii) the first accessibility-compliant design data, determine a second set of operations to apply to the second initial design data; and apply the second set of operations to the second initial design data and thereby generate second accessibility-compliant design data.

3. The computing system of claim 1, wherein the accessibility-compliant design data for each of the at least two visual interface design elements comprises a cascading style sheet (CSS) file or a javascript object notation (JSON) file.

4. The computing system of claim 3, further comprising program instructions that are executable by the at least one processor such that the computing system is configured to:
transmit, to a computing device, the accessibility-compliant design data for each of the at least two visual interface design elements, the accessibility-compliant design data usable, by the computing device, to produce, for each of the at least two visual interface design elements, respective accessibility-compliant content.

5. The computing system of claim 1, further comprising program instructions that are executable by the at least one processor such that the computing system is configured to:
based on the accessibility-compliant design data for each of the at least two visual interface design elements, cause a visual representation of accessibility-compliant content for each of the at least two visual interface design elements to be displayed via a computing device.

6. The computing system of claim 1, wherein the at least two visual interface design elements comprise a first visual interface design element and second visual interface design element, the first visual interface design element comprising a color palette for the visual interface design and the second visual interface design element comprising a typography for the visual interface design.

7. The computing system of claim 1, further comprising program instructions that are executable by the at least one processor such that the computing system is configured to:
after generating the accessibility-compliant design data for the composite visual interface design element, receive updated input data, the updated input data comprising an updated accessibility compliance standard; and
based on the updated input data, automatically:
update the respective sets of operations to apply to the respective initial design data to generate updated accessibility-compliant design data for each of the at least two visual interface design elements, the updated accessibility-compliant design data usable to produce, for each of the at least two visual interface design elements, respective updated accessibility-compliant content;
apply each updated set of operations to the respective initial design data and thereby generate the updated accessibility-compliant design data for each of the at least two visual interface design elements;
combine the updated accessibility-compliant design data for each of the at least two visual interface design elements to thereby generate updated accessibility-compliant design data for a composite visual interface design element; and
based on the updated accessibility-compliant design data for the composite visual interface design element, cause a visual representation of updated accessibility-compliant content for the composite visual interface design element to be displayed.

8. The computing system of claim 1, wherein the input data further comprises an indication of at least one user impairment, wherein the accessibility-compliant design data is usable to produce, for each of the at least two visual interface design elements, accessibility-compliant content for the at least one user impairment, and wherein the composite accessibility-compliant design data usable to produce, for the composite visual interface design element, accessibility-compliant content for the at least one user impairment.

9. The computing system of claim 8, wherein the at least one user impairment comprises one or more of a vision impairment, a hearing impairment, a learning impairment, a motion impairment, or a cognition impairment.

10. At least one non-transitory computer-readable medium, wherein the at least one non-transitory computer-readable medium is collectively provisioned with program instructions that, when executed by at least one processor, cause a computing system to:
receive input data for a visual interface design, the input data comprising:
a target accessibility compliance standard; and
initial design data for at least two visual interface design elements;
based on the input data, determine a respective set of operations to apply to the respective initial design data to generate accessibility-compliant design data for each of the at least two visual interface design elements, the accessibility-compliant design data usable to produce, for each of the at least two visual interface design elements, respective accessibility-compliant content;
apply each respective set of operations to the respective initial design data and thereby generate the accessibility-compliant design data for each of the at least two visual interface design elements;
combine the accessibility-compliant design data for each of the at least two visual interface design elements to thereby generate composite accessibility-compliant design data for a composite visual interface design element, the composite accessibility-compliant design data usable to produce, for the composite visual interface design element, accessibility-compliant content; and
based on the accessibility-compliant design data for the composite visual interface design element, cause a visual representation of accessibility-compliant content for the composite visual interface design element to be displayed.

11. The at least one non-transitory computer-readable medium of claim 10, wherein the initial design data for at least two visual interface design elements comprises first initial design data for a first visual interface design element and second initial design data for a second visual interface design element, and wherein the program instructions that, when executed by at least one processor, cause the computing system to (i) determine a respective set of operations to apply to the respective initial design data to generate accessibility-compliant design data for each of the at least two visual interface design elements and (ii) apply the set of operations to the respective initial design data and thereby generate the accessibility-compliant design data for each of the at least two visual interface design elements comprise program instructions that, when executed by at least one processor, cause the computing system to:
based on the input data, determine a first set of operations to apply to the first initial design data;

apply the first set of operations to the first initial design data and thereby generate first accessibility-compliant design data;

based on (i) the input data and (ii) the first accessibility-compliant design data, determine a second set of operations to apply to the second initial design data; and apply the second set of operations to the second initial design data and thereby generate second accessibility-compliant design data.

12. The at least one non-transitory computer-readable medium of claim 10, wherein the accessibility-compliant design data for each of the at least two visual interface design elements comprises a cascading style sheet (CSS) file or a javascript object notation (JSON) file.

13. The at least one non-transitory computer-readable medium of claim 12, wherein the at least one non-transitory computer-readable medium is also collectively provisioned with program instructions that, when executed by at least one processor, cause the computing system to:

transmit, to a computing device, the accessibility-compliant design data for each of the at least two visual interface design elements, the accessibility-compliant design data usable, by the computing device, to produce, for each of the at least two visual interface design elements, respective accessibility-compliant content.

14. The at least one non-transitory computer-readable medium of claim 10, wherein the at least one non-transitory computer-readable medium is also collectively provisioned with program instructions that, when executed by at least one processor, cause the computing system to:

based on the accessibility-compliant design data for each of the at least two visual interface design elements, cause a visual representation of accessibility-compliant content for each of the at least two visual interface design elements to be displayed via a computing device.

15. The at least one non-transitory computer-readable medium of claim 10, wherein the at least two visual interface design elements comprise a first visual interface design element and second visual interface design element, the first visual interface design element comprising a color palette for the visual interface design and the second visual interface design element comprising a typography for the visual interface design.

16. The at least one non-transitory computer-readable medium of claim 10, wherein the at least one non-transitory computer-readable medium is also collectively provisioned with program instructions that, when executed by at least one processor, cause the computing system to:

after generating the accessibility-compliant design data for the composite visual interface design element, receive updated input data, the updated input data comprising an updated accessibility compliance standard;

based on the updated input data, automatically:
update the respective sets of operations to apply to the respective initial design data to generate updated accessibility-compliant design data for each of the at least two visual interface design elements, the updated accessibility-compliant design data usable to produce, for each of the at least two visual interface design elements, respective updated accessibility-compliant content;

apply each updated set of operations to the respective initial design data and thereby generate the updated accessibility-compliant design data for each of the at least two visual interface design elements;

combine the updated accessibility-compliant design data for each of the at least two visual interface design elements to thereby generate updated accessibility-compliant design data for a composite visual interface design element; and based on the updated accessibility-compliant design data for the composite visual interface design element, cause a visual representation of updated accessibility-compliant content for the composite visual interface design element to be displayed.

17. The at least one non-transitory computer-readable medium of claim 10, wherein the input data further comprises an indication of at least one user impairment, wherein the accessibility-compliant design data is usable to produce, for each of the at least two visual interface design elements, accessibility-compliant content for the at least one user impairment, and wherein the composite accessibility-compliant design data usable to produce, for the composite visual interface design element, accessibility-compliant content for the at least one user impairment.

18. The at least one non-transitory computer-readable medium of claim 17, wherein the at least one user impairment comprises one or more of a vision impairment, a hearing impairment, a learning impairment, a motion impairment, or a cognition impairment.

19. A method carried out by a computing system, the method comprising:

receiving input data for a visual interface design, the input data comprising:
a target accessibility compliance standard; and
initial design data for at least two visual interface design elements;

based on the input data, determining a respective set of operations to apply to the respective initial design data to generate accessibility-compliant design data for each of the at least two visual interface design elements, the accessibility-compliant design data usable to produce, for each of the at least two visual interface design elements, respective accessibility-compliant content;

applying each respective set of operations to the respective initial design data and thereby generating the accessibility-compliant design data for each of the at least two visual interface design elements;

combining the accessibility-compliant design data for each of the at least two visual interface design elements to thereby generate composite accessibility-compliant design data for a composite visual interface design element, the composite accessibility-compliant design data usable to produce, for the composite visual interface design element, accessibility-compliant content; and based on the accessibility-compliant design data for the composite visual interface design element, causing a visual representation of accessibility-compliant content for the composite visual interface design element to be displayed.

20. The method of claim 19, wherein the initial design data for at least two visual interface design elements comprises first initial design data for a first visual interface design element and second initial design data for a second visual interface design element, and wherein (i) determining a respective set of operations to apply to the respective initial design data to generate accessibility-compliant design data for each of the at least two visual interface design elements and (ii) applying the set of operations to the respective initial design data and thereby generating the accessibility-compliant design data for each of the at least two visual interface design elements comprises:
- based on the input data, determining a first set of operations to apply to the first initial design data;
- applying the first set of operations to the first initial design data and thereby generating first accessibility-compliant design data;
- based on (i) the input data and (ii) the first accessibility-compliant design data, determining a second set of operations to apply to the second initial design data; and
- applying the second set of operations to the second initial design data and thereby generating second accessibility-compliant design data.

* * * * *